(12) United States Patent
Milam

(10) Patent No.: US 10,295,165 B2
(45) Date of Patent: May 21, 2019

(54) LIGHTING DEVICE, ASSEMBLY AND METHOD

(71) Applicant: HelioHex, LLC, Canastota, NY (US)

(72) Inventor: Adam A. Milam, Canastota, NY (US)

(73) Assignee: HelioHex, LLC, Canastota, NY (US)

( * ) Notice: Subject to any disclaimer, the term of this patent is extended or adjusted under 35 U.S.C. 154(b) by 46 days.

(21) Appl. No.: 15/223,409

(22) Filed: Jul. 29, 2016

(65) Prior Publication Data

US 2017/0030566 A1 Feb. 2, 2017

Related U.S. Application Data

(60) Provisional application No. 62/198,812, filed on Jul. 30, 2015.

(51) Int. Cl.

| | |
|---|---|
| *F21S 4/00* | (2016.01) |
| *F21V 29/503* | (2015.01) |
| *F21V 29/51* | (2015.01) |
| *F21V 29/71* | (2015.01) |
| *F21V 29/76* | (2015.01) |
| *A01G 9/20* | (2006.01) |
| *F21S 8/06* | (2006.01) |
| *F21V 21/008* | (2006.01) |

(Continued)

(52) U.S. Cl.
CPC ............. *F21V 29/503* (2015.01); *A01G 9/20* (2013.01); *A01G 9/26* (2013.01); *F21S 8/06* (2013.01); *F21V 21/008* (2013.01); *F21V 21/14* (2013.01); *F21V 29/51* (2015.01); *F21V 29/713* (2015.01); *F21V 29/763* (2015.01); *F21V 29/773* (2015.01); *F21S 2/005* (2013.01); *F21S 9/02* (2013.01); *F21V 21/36* (2013.01); *F21V 29/83* (2015.01); *F21Y 2113/00* (2013.01); *F21Y 2115/10* (2016.08); *F21Y 2115/15* (2016.08); *Y02A 40/274* (2018.01)

(58) Field of Classification Search
CPC ...... F21V 29/503; F21V 29/51; F21V 29/713; F21V 29/763; F21V 29/773; F21V 21/008; F21V 21/14; A01G 9/20; F21S 8/06
USPC .................................................. 362/249.14
See application file for complete search history.

(56) References Cited

U.S. PATENT DOCUMENTS

| | | |
|---|---|---|
| 3,686,498 A | 8/1972 | Meyer |
| 4,316,238 A | 2/1982 | Booty et al. |

(Continued)

FOREIGN PATENT DOCUMENTS

WO 2015186016 A1 12/2015

OTHER PUBLICATIONS

PCT/US2016/044722; International Filing Date Jul. 29, 2016; International Search Report and Written Opinion; dated Dec. 16, 2016 (11 pages).

(Continued)

*Primary Examiner* — Elmito Breval
*Assistant Examiner* — Meghan Ulanday
(74) *Attorney, Agent, or Firm* — Barclay Damon LLP

(57) ABSTRACT

A lighting device, assembly and method includes, in an embodiment, a lighting device having a light source. The lighting device also has a heat transfer device. The heat transfer device includes a primary conductor connected to the light source and a plurality of secondary conductors connected to the primary conductor. The secondary conductors define at least one heat transfer passageway extending in the upward direction.

21 Claims, 42 Drawing Sheets

(51) Int. Cl.
*F21V 21/14* (2006.01)
*F21V 29/77* (2015.01)
*A01G 9/26* (2006.01)
*F21S 9/02* (2006.01)
*F21S 2/00* (2016.01)
*F21V 21/36* (2006.01)
*F21Y 113/00* (2016.01)
*F21V 29/83* (2015.01)
*F21Y 115/10* (2016.01)
*F21Y 115/15* (2016.01)

(56) References Cited

U.S. PATENT DOCUMENTS

| | | | |
|---|---|---|---|
| 5,556,195 | A | 9/1996 | Glebe |
| 6,267,483 | B1 | 7/2001 | Hembery |
| 7,078,732 | B1 | 7/2006 | Reeh et al. |
| 7,434,964 | B1 | 10/2008 | Zheng et al. |
| 7,494,249 | B2 | 2/2009 | Li |
| 7,772,604 | B2 | 8/2010 | Duong et al. |
| 7,952,262 | B2 | 5/2011 | Wilcox et al. |
| 7,959,332 | B2 | 6/2011 | Tickner et al. |
| 8,168,992 | B2 | 5/2012 | Chang et al. |
| 8,220,961 | B2 | 7/2012 | Belknap et al. |
| 8,220,970 | B1 | 7/2012 | Khazi et al. |
| 8,529,100 | B1 | 9/2013 | Patrick et al. |
| 8,596,821 | B2 | 12/2013 | Brandes et al. |
| 8,616,720 | B2 | 12/2013 | Carney et al. |
| 8,690,384 | B2 | 4/2014 | Hochstein |
| 8,757,842 | B2 | 6/2014 | Ter-Hovhannisyan |
| 8,850,742 | B2 | 10/2014 | Dubé |
| 8,931,934 | B2 | 1/2015 | Lin |
| 9,082,921 | B2 | 7/2015 | Wilcox et al. |
| 9,466,772 | B2 | 10/2016 | Tudhope et al. |
| 2002/0021568 | A1 | 2/2002 | Wardenburg |
| 2005/0128751 | A1 | 6/2005 | Roberge et al. |
| 2006/0006820 | A1 | 1/2006 | Roseman et al. |
| 2007/0053168 | A1 | 3/2007 | Sayir et al. |
| 2009/0103296 | A1 | 4/2009 | Harbers et al. |
| 2009/0321045 | A1 | 12/2009 | Hernon et al. |
| 2010/0157603 | A1 | 6/2010 | Quadri et al. |
| 2011/0057551 | A1 | 3/2011 | Lee et al. |
| 2012/0002401 | A1 | 1/2012 | Clifford |
| 2012/0198762 | A1 | 8/2012 | Lee |
| 2012/0257374 | A1* | 10/2012 | Daniel ............... F21K 9/90 362/84 |
| 2012/0314430 | A1 | 12/2012 | McCanless |
| 2015/0016105 | A1* | 1/2015 | Lin ............... F21V 21/008 362/231 |
| 2015/0276201 | A1 | 10/2015 | Kim et al. |
| 2016/0153647 | A1 | 6/2016 | Lin et al. |
| 2016/0192598 | A1* | 7/2016 | Haggarty ............... A01G 7/045 315/297 |

OTHER PUBLICATIONS

Small Aquaponics; Indoor Auqaponics Video; Jan. 2, 2013; retrieved from the Internet: https://www.youtube.com/watch?v=q7x4Ot2To_A; 10 pages.

Viagrow 26 in. Grow Light Hanger; on or before Sep. 2, 2012; retrieved from the Internet: <http://www.homedepot.com/p/Viagrow-26-in-Grow-Light-Hanger-VLH26/202985196?keyword=viagrow+26+in.+grow+light+hanger>; 2 pages.

Lamonica, Martin, Energy, Cree; Feb. 18, 2014; retrieved from the Internet: <https://www.technologyreview.com/s/524526/bright-bulbs/>; 4 pages.

Patents for Methods in Optimizing LED Lighting for Plants; May 5, 2015; Heliospectra AB; retrieved from <https://www.heliospectra.com/blog/heliospectras-canadian-patent-application-approved-canadian-intellectual-property-office>; 6 pages.

Bill Schweber; Thermal Considerations for PED-Based Luminaires; Sep. 9, 2014; Digi-Key Electronics; retrieved from the Internet: <http://www.digikey.com/en/articles/techzone/2014/sep/thermal-considerations-for-led-based-luminaires>;4 pages.

Honeycomb Light Fixtures; Google Image Search Jul. 4, 1990-Jul. 29, 2015; 4 pages.

* cited by examiner

LIGHTING DEVICE, ASSEMBLY AND METHOD

CROSS-REFERENCE TO RELATED APPLICATION

This application is a non-provisional of, and claims the benefit and priority of, U.S. Provisional Patent Application No. 62/198,812, filed on Jul. 30, 2015. The entire contents of such application are hereby incorporated by reference.

BACKGROUND

Lamps incorporate light sources, such as light bulbs or tubes. Each lamp produces its own light pattern. In applications such as horticulture lighting, laboratory lighting or electronic display screens, the location and distribution of the light patterns can be very important. For example, if plants or cell cultures on one area of a table receive substantially less light than plants or cell cultures on another area of the table, those with less light can suffer in their development, growth, production yield or health. The low intensity zones can also cause undesirable dimness in areas of display screens with internal lamps.

In horticulture and laboratory applications, users are known to place items (e.g., plants or cell cultures) in select locations in attempts to reduce these negative effects of the low intensity zones. However, the known lamps have relatively high variations in the magnitudes of their low intensity zones. These variations increase the difficulty in managing the positions of the items, often leading to underdevelopment or harm of a significant quantity of items. In display screen applications, these relatively high variations in intensity can increase the complexity in regulating the displays to generate high quality images.

In addition, the heat generated by the lamps can have several disadvantages. The heat can damage, harm, injure or lower the life span of items. In the case of horticulture or laboratory lighting, the heat can kill plants or cell cultures, or the heat can diminish their development, production yield or health. Also, the heat can reduce the life span of the electronic components of the light fixtures, display screens or other modules which house the lamps.

The foregoing background describes some, but not necessarily all, of the problems, disadvantages and shortcomings related to the known lamps.

SUMMARY

In an embodiment, a lighting device includes: (a) a light source operable to direct light in a downward direction; and (b) a heat transfer device. The heat transfer device includes: (a) a primary conductor connected to the light source, wherein the primary conductor extends upward from the light source in an upward direction; (b) a plurality of secondary conductors connected to the primary conductor, wherein the secondary conductors define at least one heat transfer passageway extending in the upward direction; and (c) a coupler configured to couple the lighting device to a structure.

In another embodiment, a lighting assembly includes a plurality of lighting devices configured to be connected to each other to form a set. Each of the lighting devices includes: (a) a light source operable to direct light in a downward direction; (b) a heat transfer device defining at least one heat transfer passageway extending upward from the light source in an upward direction; and (c) at least one coupler configured to couple the lighting assembly to a structure located upward from the light sources. The set has at least three of the light sources. Each one of the light sources within the set is equally distanced from all other light sources within the set. Due to the equal distancing, the light sources of the set are operable to generate light patterns having centers which are equally distanced from one another.

In yet another embodiment, a lighting assembly includes a set of light sources connected to each other. A set plane passes through the set, and the set plane extends along a first axis and a second axis. The second axis is perpendicular to the first axis. In a lighting mode, the set is configured to be positioned so that the light sources direct light in a downward direction. The lighting assembly also has a hanging device configured to hang the set from a structure. The structure extends in a structure plane. The hanging device is operable to adjust a distance between the set plane and the structure plane. The hanging device has a leveling device. The leveling device is configured to enable freedom of tilting of the set plane relative to both the first and second axes. The leveling device maintains the set plane parallel (or substantially parallel) to the structure plane after the distance is adjusted.

Additional features and advantages of the present disclosure are described in, and will be apparent from, the following Brief Description of the Drawings and Detailed Description.

DETAILED DESCRIPTION

1. Lighting Devices

Figure 1:
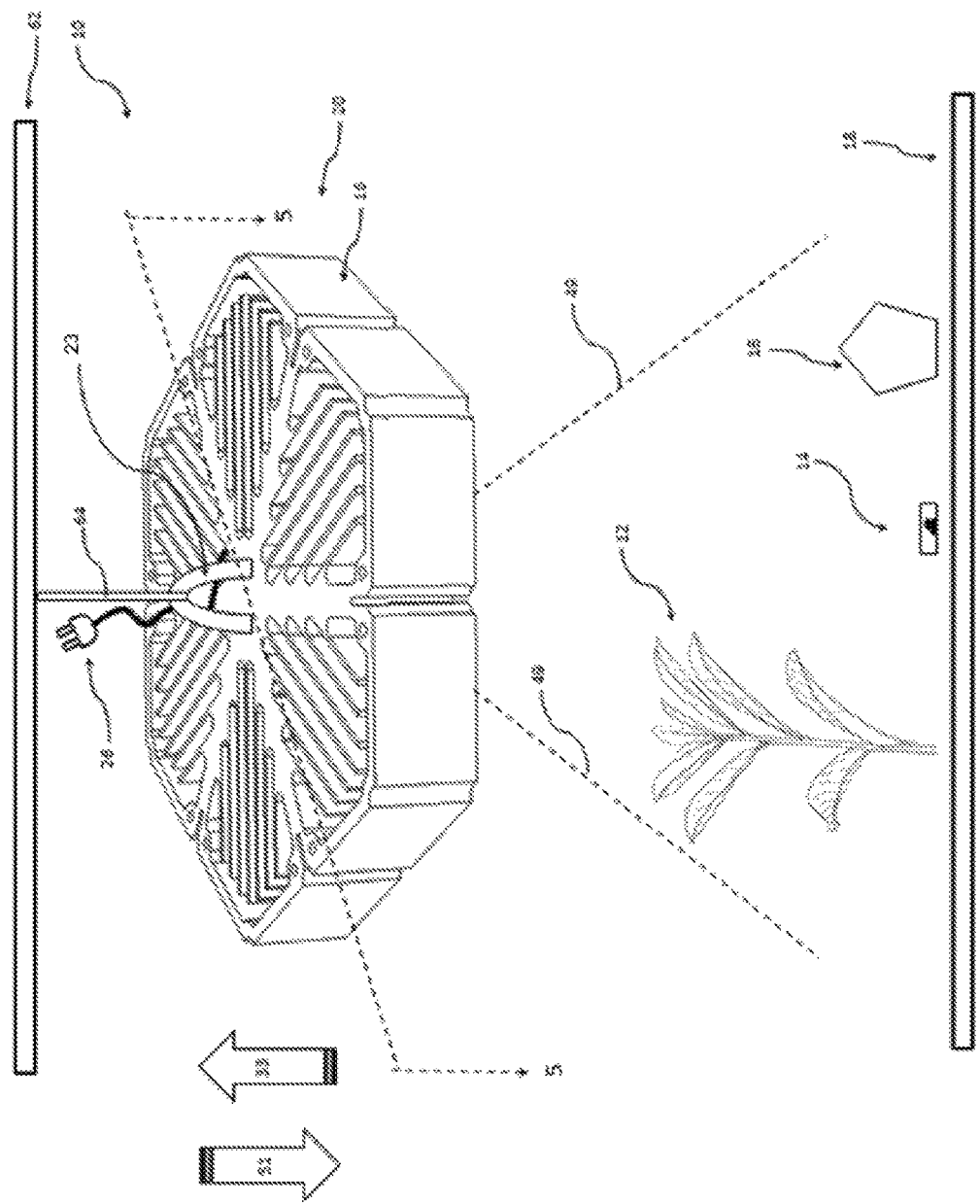
FIG. 1 is a top isometric view of an embodiment of a lighting device.

In an embodiment illustrated in FIGS. 1-5, the lighting device 10 is operable to illuminate, and generate light toward, a plurality of different types of items, such as a plant 12, a cell culture 14 or other light-receiving items 16, including, but not limited to, horticulture plant beds, garden plant beds, agricultural items (e.g., fruit and vegetables), animals, food, patients or users undergoing medical treatment, healthcare or beauty care, and viewers of electronic images, including fans in a sports stadium or other venue. Depending upon the embodiment, the lighting device 10 is a stand-alone, ceiling-mountable light fixture, or the lighting device 10 is incorporated into: (a) a mountable or hangable light fixture; (b) a free-standing structure such as a building's ceiling or geodesic dome; (c) a medical imaging or medical treatment device, such as a light therapy apparatus; (d) a beauty care device; (e) an electronic display screen or monitor, such as a computer screen, stadium scoreboard or outdoor display screen; or (f) another type of equipment, machine or apparatus. In one circumstance, the items 12, 14, 16 are placed upon, and supported by, an item support surface 18, such as a counter or tabletop.

Figure 2:
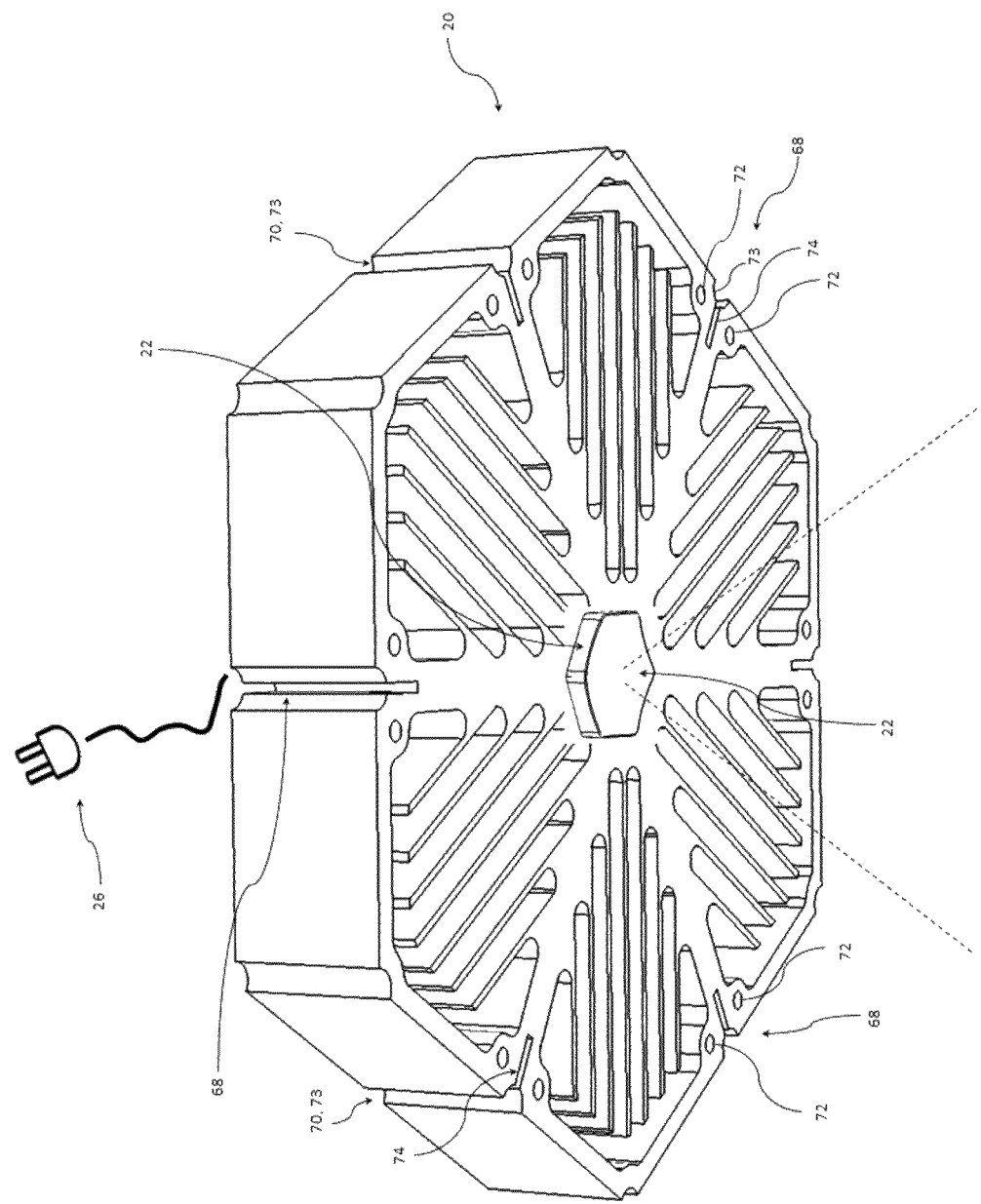
FIG. 2 is a bottom isometric view of the lighting device of FIG. 1.

Referring to FIGS. 1-2, the lighting device 10 includes a heat sink or heat transfer device 20, a light source 22, a coupler 23 and an electrical power cord 26 operatively coupled to the light source 22. The heat transfer device 20 functions as a body of the lighting device 10, and the heat transfer device 20 also functions to transfer heat away from the light source 22 and items 12, 14, 16, as described below. The light source 22 can include any type of light generating device, light generator or light emitter, including, but not limited to, a point light source or an elongated or tubular-shaped light source. Depending upon the embodiment, a point light source can include a single light emitter (e.g., a single light emitting diode (LED), a single light-generating filament, a single gas-filled bulb or a single gas-filled tube). Alternatively, a point light source can include a plurality of light emitters (e.g., a plurality of LEDs, a plurality of light-generating filaments, a plurality of gas-filled bulbs or a plurality of gas-filled tubes). In an embodiment, a point light source has a concave, semi-spherical or dome-shaped light director or reflector which redirects the light of the one or more light emitters in a lighting direction toward a single point. In contrast, an elongated lamp having a florescent tube, for example, includes a tubular or tunnel-shaped reflector which extends along a longitudinal axis. Such tunnel-shaped reflector redirects light toward and along a longitudinal axis. The longitudinal axis extends parallel to such reflector's longitudinal axis.

Also, depending upon the embodiment, a variety of different types of emitters can be used in the light source 22, including, but not limited to, one or more LEDs, organic light-emitting diodes (OLEDs), incandescent light bulbs, florescent bulbs including compact florescent light (CFL) bulbs, magnetic induction florescent bulbs, halogen light bulbs, metal halide bulbs, high pressure sodium bulbs, and high intensity discharge (HID) modules incorporating a combination of metal halide bulbs and high pressure sodium bulbs.

For applications such as horticulture or agriculture, the light source 22 can generate artificial light within a spectrum of sunlight suitable for the intended horticulture or growth objectives. For example, the spectrum associated with blue light can aid in vegetative growth, and the spectrum associated with red and orange light can aid with the flowering process of plants.

Figure 3:
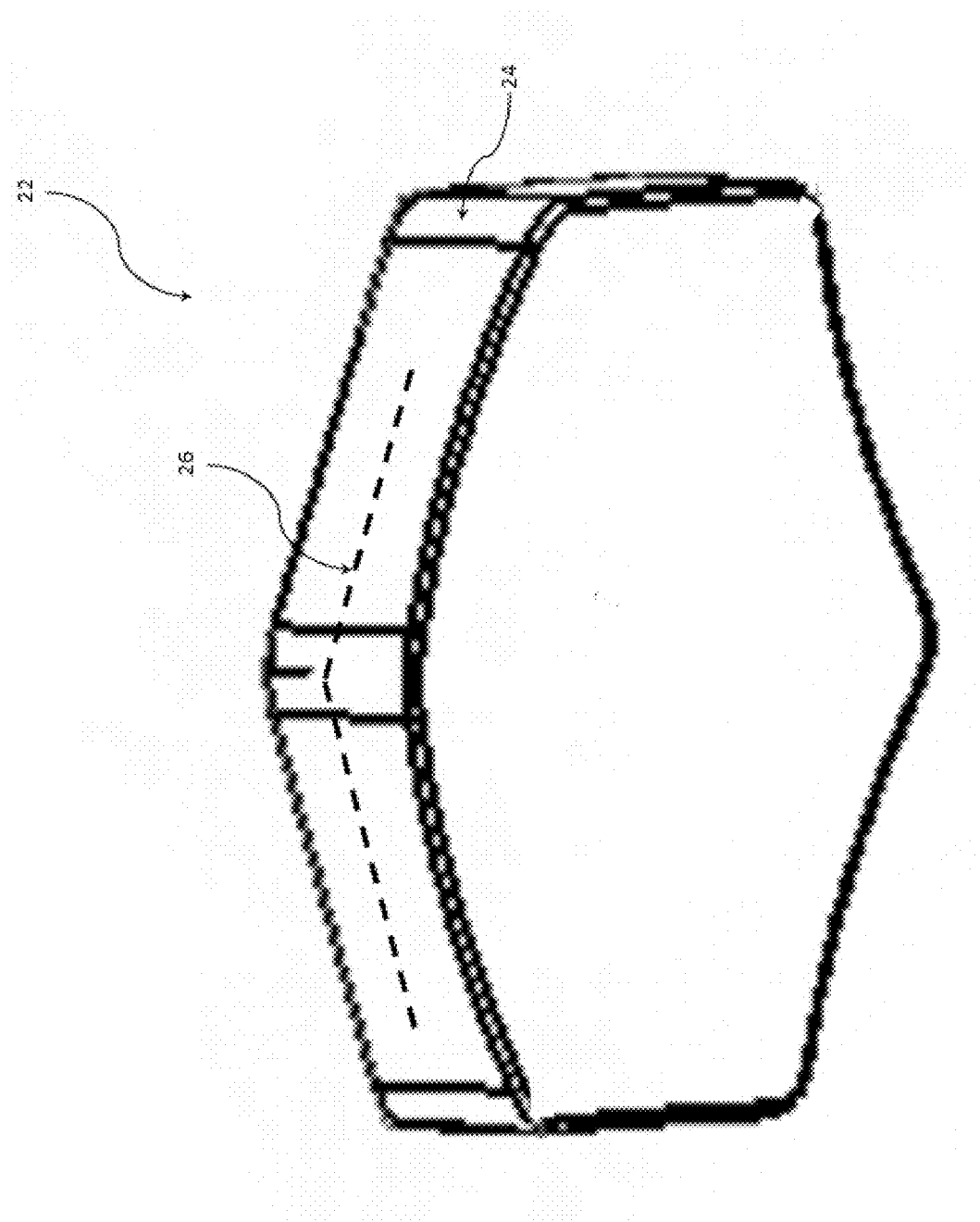
FIG. 3 is bottom isometric view of an embodiment of a light source.
Figure 4:
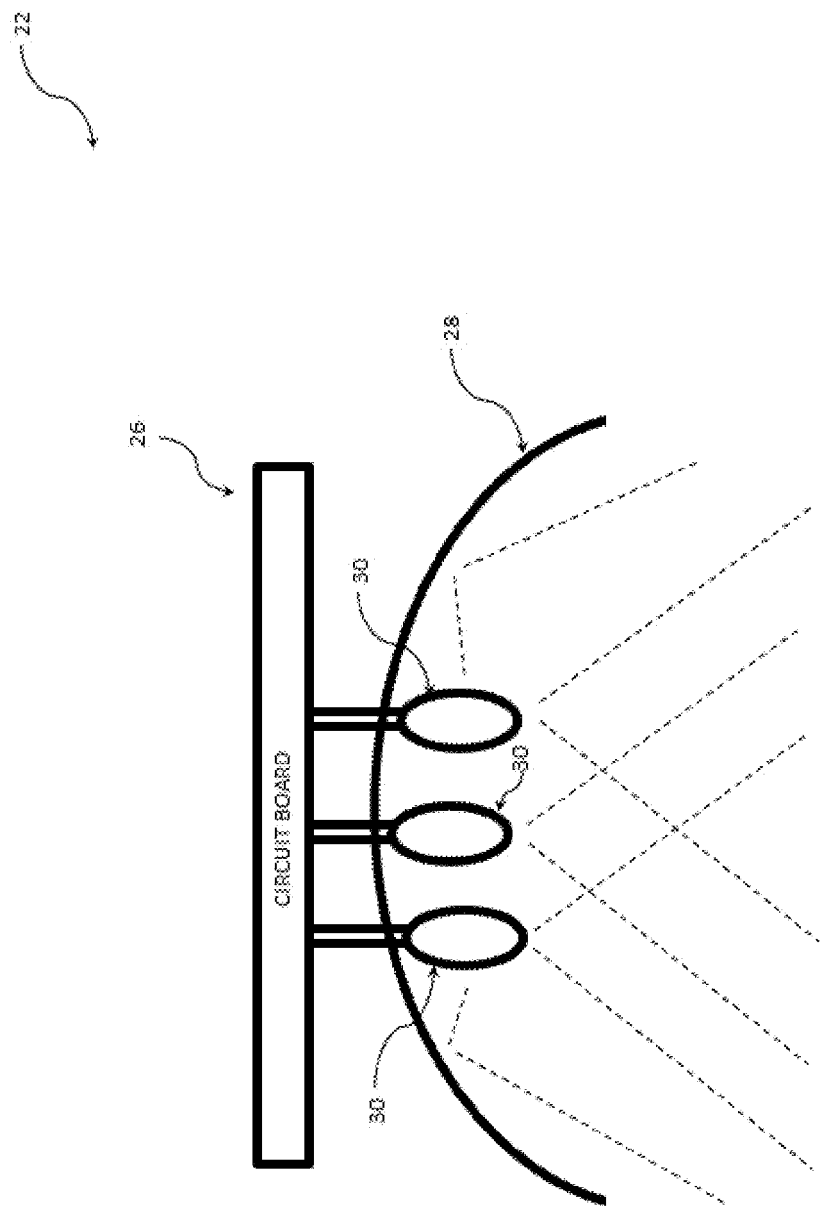
FIG. 4 is a schematic diagram of an embodiment of a light source.

As illustrated in FIGS. 3-4, in an embodiment, the light source 22 includes: (a) a transparent or translucent cover or housing 24; (b) an electrical circuit board 26 positioned within the cavity of the housing 24; (c) a reflector or light director 28, such as a mirror surface, having a spherical, concave shape; (d) one or more light emitters 30, such as LEDs, electrically coupled the circuit board 26; (f) a gasket or environmental seal (not shown) which forms a seal between the housing 24 and the heat transfer device 20 (FIG.

1); and (g) a fastener, coupler or adhesive (not shown) operable to mount, further seal and secure the housing 24 to the heat transfer device 20.

Figure 5:
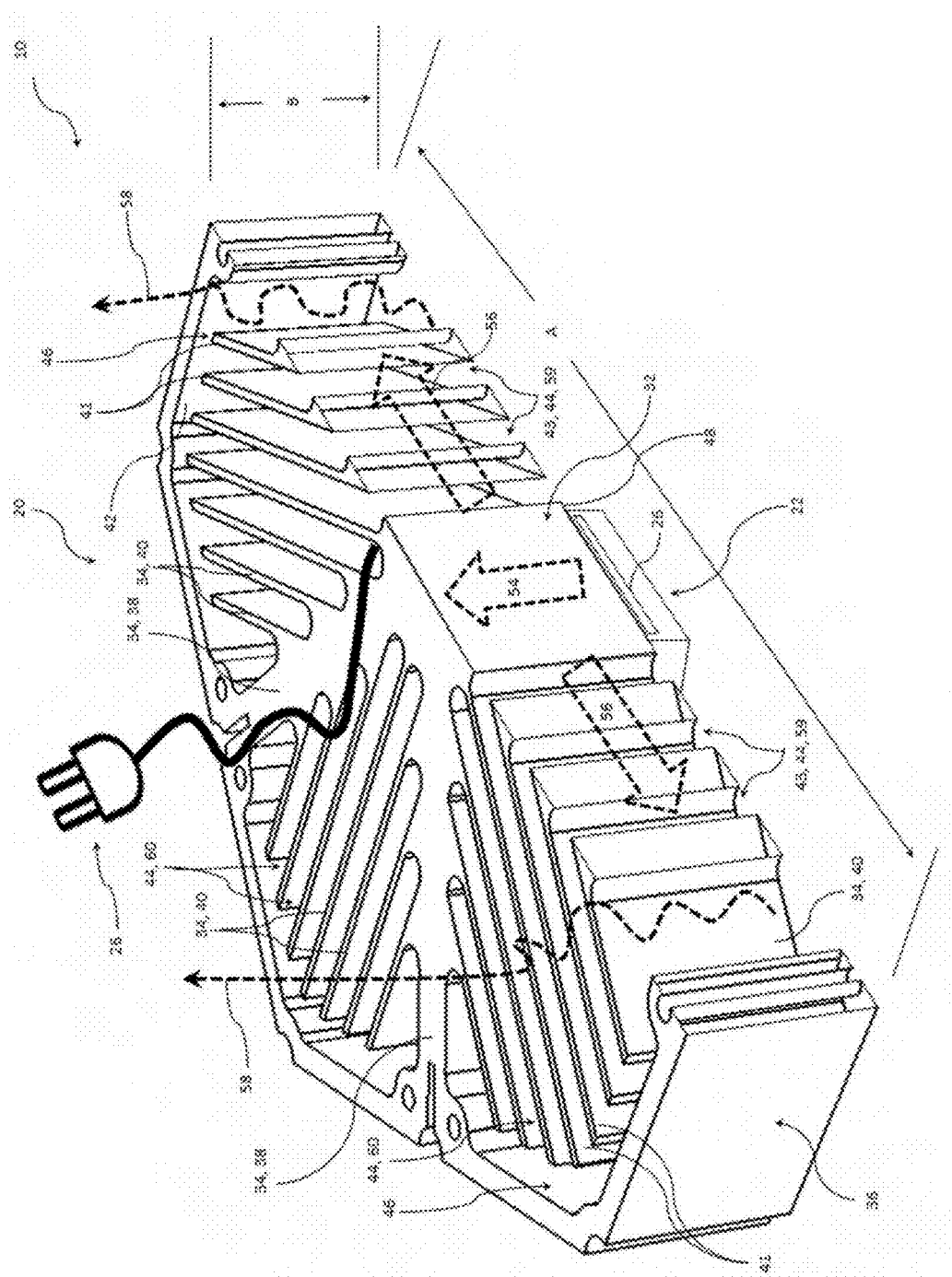
FIG. 5 is a cross-sectional, isometric view of the lighting device of FIG. 1, taken substantially along line 5-5.

As illustrated in FIG. 5, in an embodiment, the heat transfer device 20 has a hub-spoke configuration including: (a) a conductive body, conductive trunk, conductive extension or primary conductor 32 extending in an upward direction 33 (FIG. 1); (b) a plurality of conductive arms, conductive branches, conductive fins or secondary conductors 34 connected to, and extending radially from, the primary conductor 32; and (c) a retaining wall, perimeter wall or sidewall 36 extending around the perimeter of the heat transfer device 20.

In this embodiment, the secondary conductors 34 include: (a) a plurality of spokes 38 extending from the primary conductor 32 to the sidewall 36; and (b) a plurality of plates or fins 40 extending from the primary conductor 32 or spokes 38. The spokes 38 support the sidewall 36 and also serve a heat transfer role, as described below. Each fin 40 has a distal end 41 spaced apart from the inner wall surface 42 of the sidewall 36. The heat transfer device 20 forms a plurality of conduits 43. Each conduit 43 defines a plurality of vertical heat transfer channels or vertical heat transfer passageways 44 between the fins 40. In addition, the heat transfer device 20 defines a plurality of peripheral heat transfer channels or peripheral heat transfer passageways 46 between the inner wall surface 42 and the distal ends 41 of the fins 40.

In an embodiment, the central core of the primary conductor 32 has a cylindrical or tubular shape, and the primary conductor 32 has a bottom light source mount surface 48. In an embodiment, conductive, thermal paste or conductive, adhesive tape is sandwiched between the circuit board 26 and the mount surface 48. In another embodiment, the circuit board 26 is directly mounted to the mount surface 48. Referring to FIGS. 1 and 5, in operation, the light source 22 generates light 49 and directs the light 49 in a downward direction 51. During operation, the light source 22 produces thermal energy, waste heat or light source heat. The light source heat transmits through the material of primary conductor 32 in a vertical conduction direction 54, and the light source heat also transmits through the material of the primary conductor 32 in a horizontal or radial conduction direction 56. The light source heat continues to transmit vertically and radially through the material of the secondary conductors 34, eventually reaching the sidewall 36. While the light source heat is transmitting via conduction in the secondary conductors 34 and in the sidewall 36, the fluid or air 58 in the environment rises vertically due to natural convection. The up-rising air 58 flows into the lower openings 59 defined by the secondary conductors 34 and sidewall 36. As the up-rising air 58 flows through the vertical heat transfer passageways 44, 46, the up-rising air 58 absorbs the heat that has been conducted to the secondary conductors 34 and sidewall 36. Consequently, the up-rising air 58 increases in temperature and continues to flow upward until exiting the upper openings 60 defined by the secondary conductors 34 and sidewall 36.

In the embodiment shown in FIGS. 1-5, the height to width profile of the heat transfer device 20 enables a relatively rapid rate of heat transfer. The helps avoid or reduce any harmful heat effects on items 12, 14, 16 located below the lighting device 10 and also helps reduce damage or life span reduction of the light source 22. For example, depending upon the embodiment, the ratio of the width A (FIG. 5) to height B (FIG. 5) can be 2/1, 3/1, 4/1, 5/1 or greater than 5/1. In an embodiment, the A/B ratio is approximately 6/1. Based on thermal test results, the A/B ratio of 6/1 yields optimal heat transfer factors, such as heat transfer velocity and air temperature contours.

In an embodiment, the material of the heat transfer device 20 has a relatively high thermal conductivity. Depending upon the embodiment, this material can be a metallic composite including copper, aluminum or a suitable semi-conductor. In an embodiment, the heat transfer device 20 is a one-piece or unitary component manufactured through an extrusion process or a stamp and die process. In another embodiment, the heat transfer device 20 is an assembly of multiple, separate parts connected together. For example, the sidewall 16 (FIG. 5) can be separate from, but connected to, the primary and secondary conductors 32, 34. Referring to FIG. 1, the coupler 23 enables the lighting device 10 to be hung from, connected to or mounted to a structure 62, such as a ceiling, overhead beam, pole, stand or free-standing structure. The coupler 62 can include a protruding element (e.g., a hook or pulley) connected to a rod, pole, pipe, cable, rope, chain or other hang line 64. In an alternative embodiment not shown, the coupler can be a slot or threaded hole defined by the heat transfer device 20. In such embodiment, the coupler mates with a suitable screw, bolt or other fastener to: (a) connect the heat transfer device 20 to the hang line 64; or (b) connect or mount the heat transfer device 20 directly to the structure 62. As illustrated, the cord 26, in an example, plugs into an alternating current (AC) or direct current (DC) outlet (not shown) of the structure 62. In an alternative embodiment, the cord 26 lacks a plug and, instead, is wired to an electrical power supply line of the structure 62.

Figure 6:
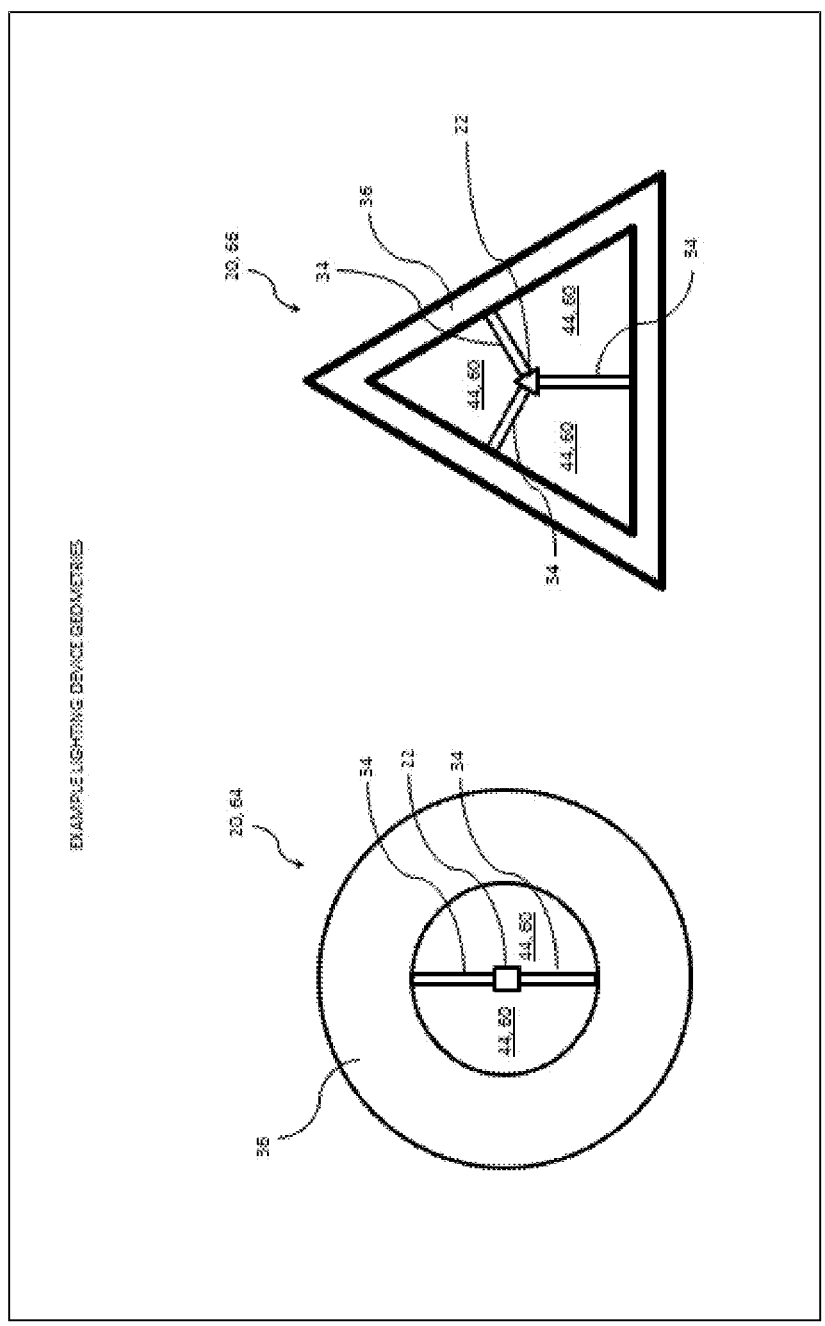
FIG. 6 is a schematic diagram of examples of lighting device geometries.

It should be appreciated that the heat transfer device 20 can have a geometric shape other than the hexagonal shape illustrated in FIGS. 1-5. For example, as illustrated in FIG. 6, the heat transfer device 20 can have a circular shape 64 or a triangular shape 66.

As illustrated in FIG. 2, in an embodiment, the lighting device 10 has a plurality of connectors or connection portions 68. Each connector portion 68 defines: (a) a vertical slot 70 configured to receive a linear fastener (e.g., a bolt or pin); and (b) a plurality of securing openings 72 configured to receive a screws, bolts, pins or other fasteners. The vertical slot 70 has a rounded slot 73 extending to a narrow slot 74. As described below, the connection portions 68 enable a plurality or assembly of lighting devices 10 to be physically connected or attached to each other.

Figure 7:
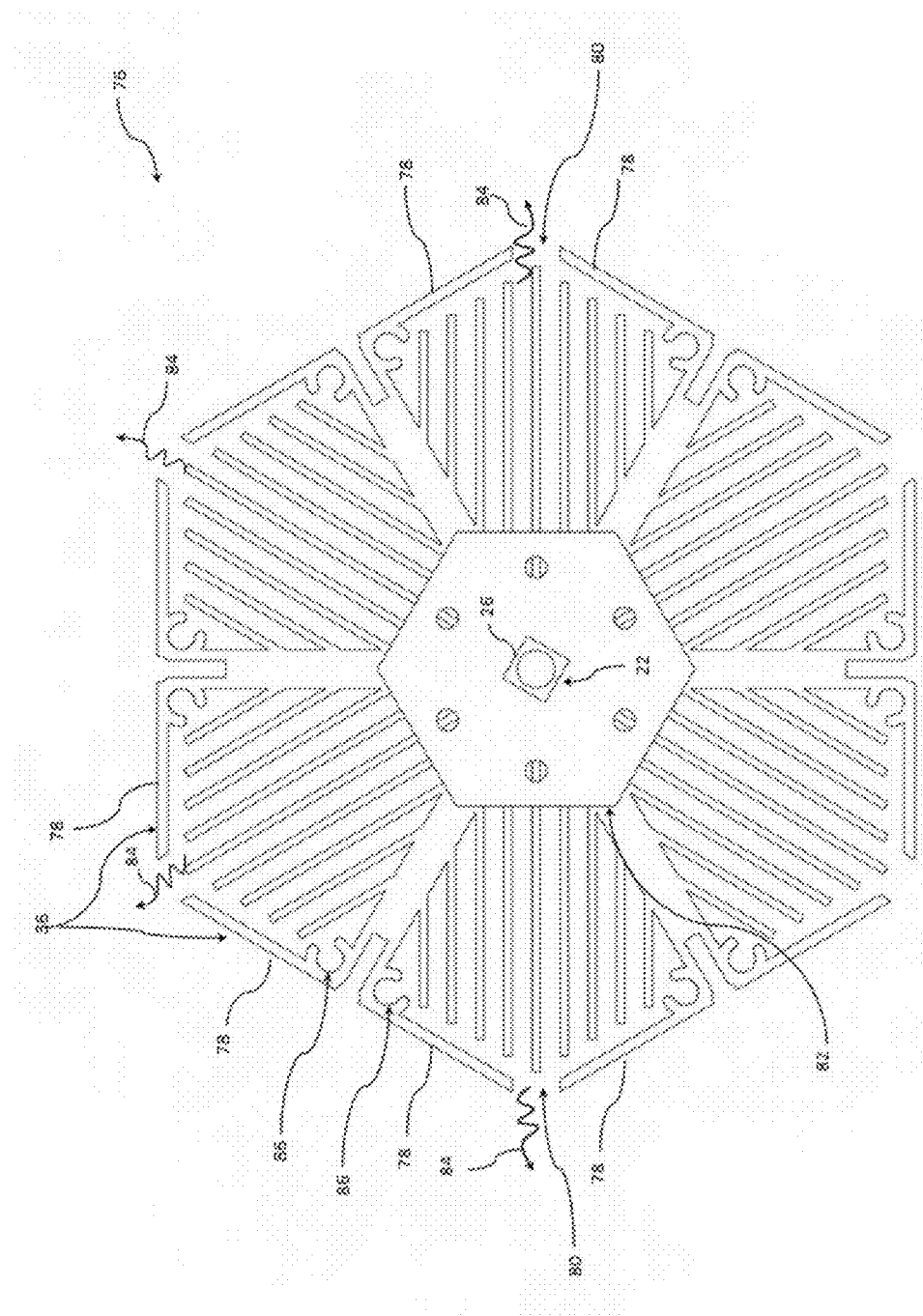
FIG. 7 is a bottom view of an embodiment of a lighting device.
Figure 8:
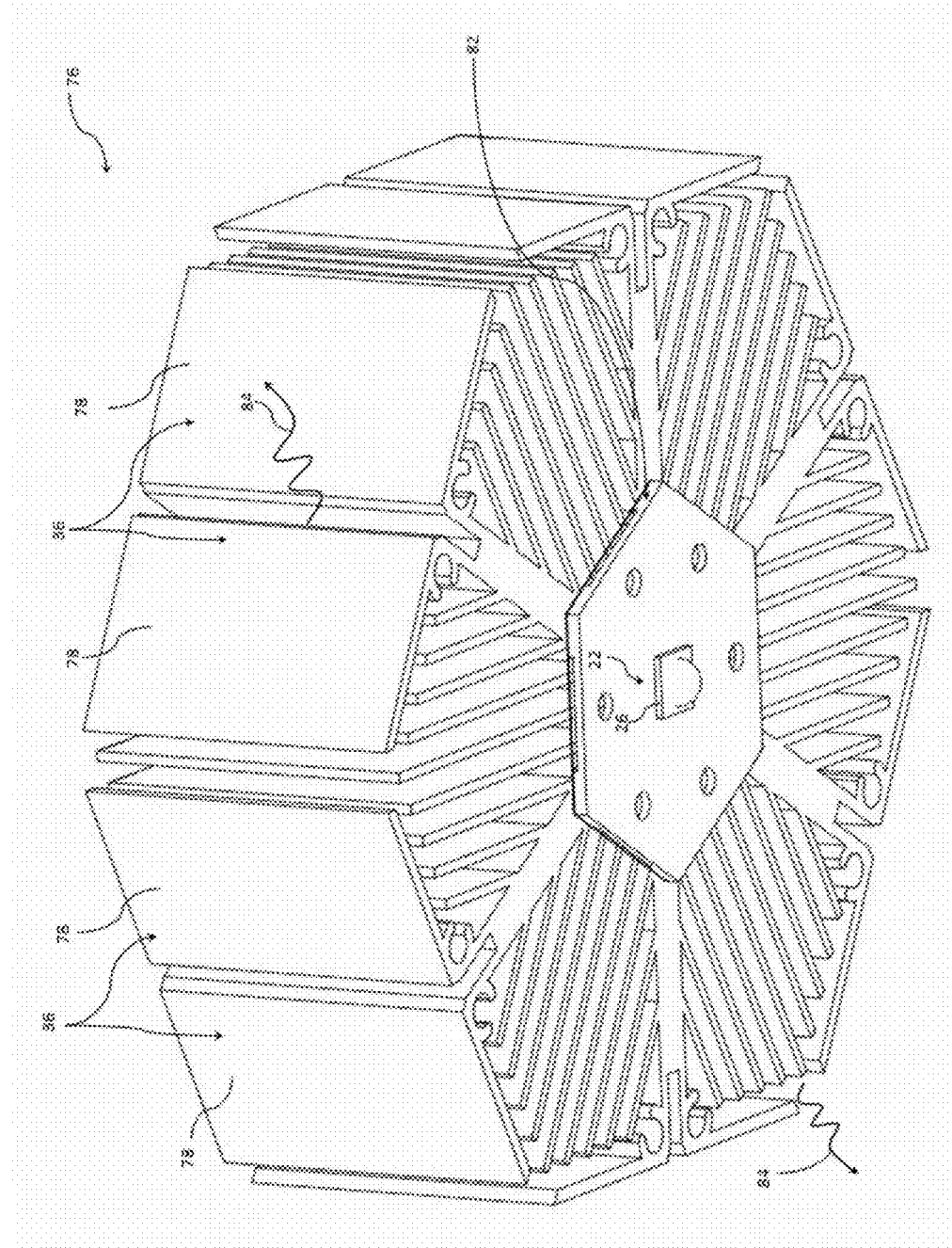
FIG. 8 is a bottom isometric view of the lighting device of FIG. 7.

In an embodiment shown in FIGS. 7-8, the lighting device 76 includes the same structure, functionality and elements as lighting device 10 except that: (a) the sidewall 36 is discontinuous and formed by a plurality of sidewall segments 78 separated by a gap or radial heat transfer passage 80; and (b) the lighting device 76 has a lower conductive platform 82, physically connected to the primary conductor 32 (FIG. 5), which supports the light source 22. The radial heat transfer passages 80 enable a portion 84 of the up-rising air 58 (FIG. 5) to exit laterally or radially through the sidewall 36. Each sidewall segment 78 has an interconnector or connection portion 86. In an embodiment, the connection portion 86 defines a tubular channel, partial tubular channel or C-shaped channel configured to receive a linear fastener (e.g., a bolt or pin). In an example, such linear fastener is connectable to an arm or connection rod which, in turn, is connectable to another linear fastener which, in turn, is insertable into the connection portion 86 of another lighting device 76. This enables installers or assemblers to assemble a plurality of lighting devices 76 together, as described below.

Figure 9:
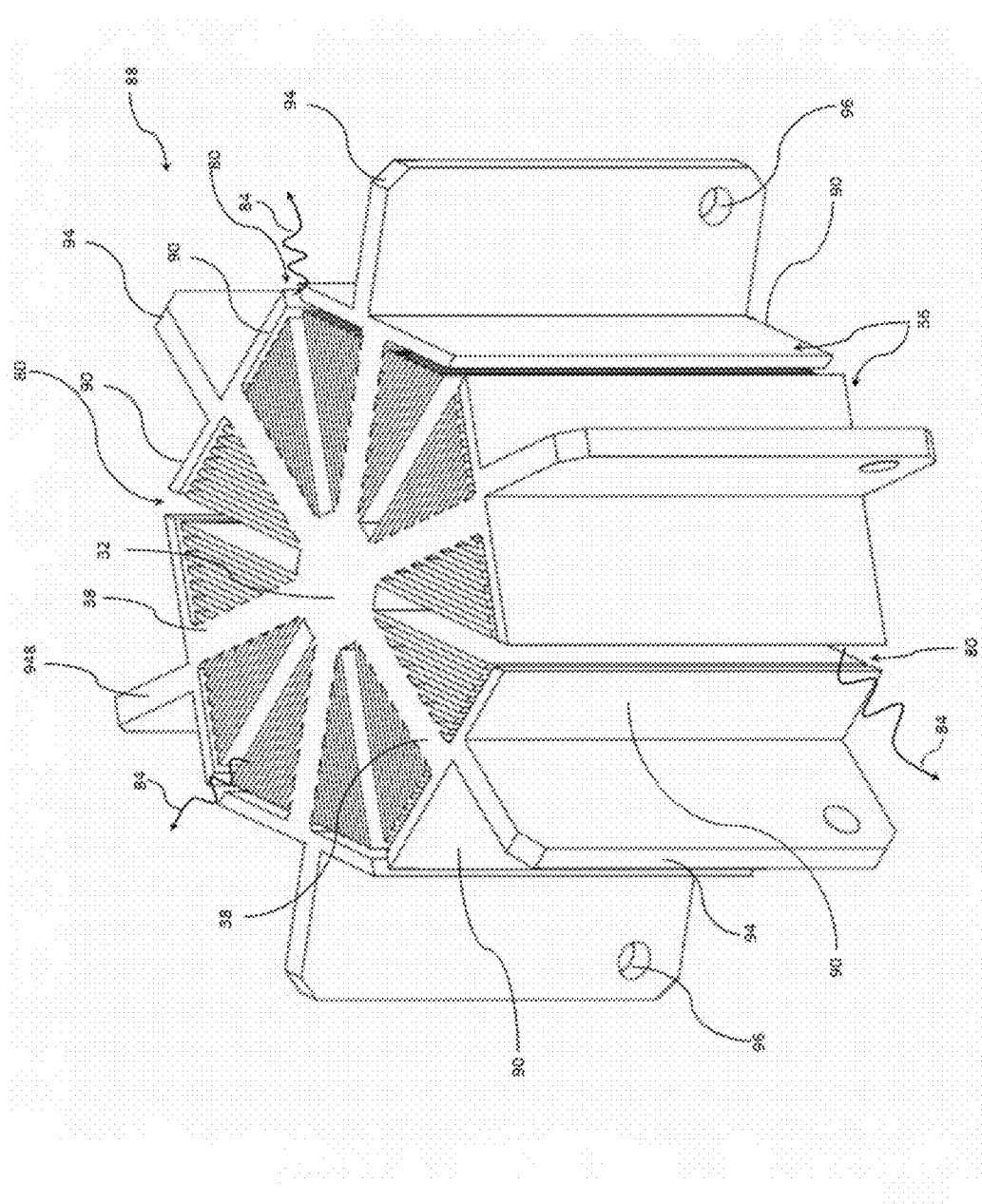
FIG. 9 is a top isometric view of a lighting device.
Figure 10:
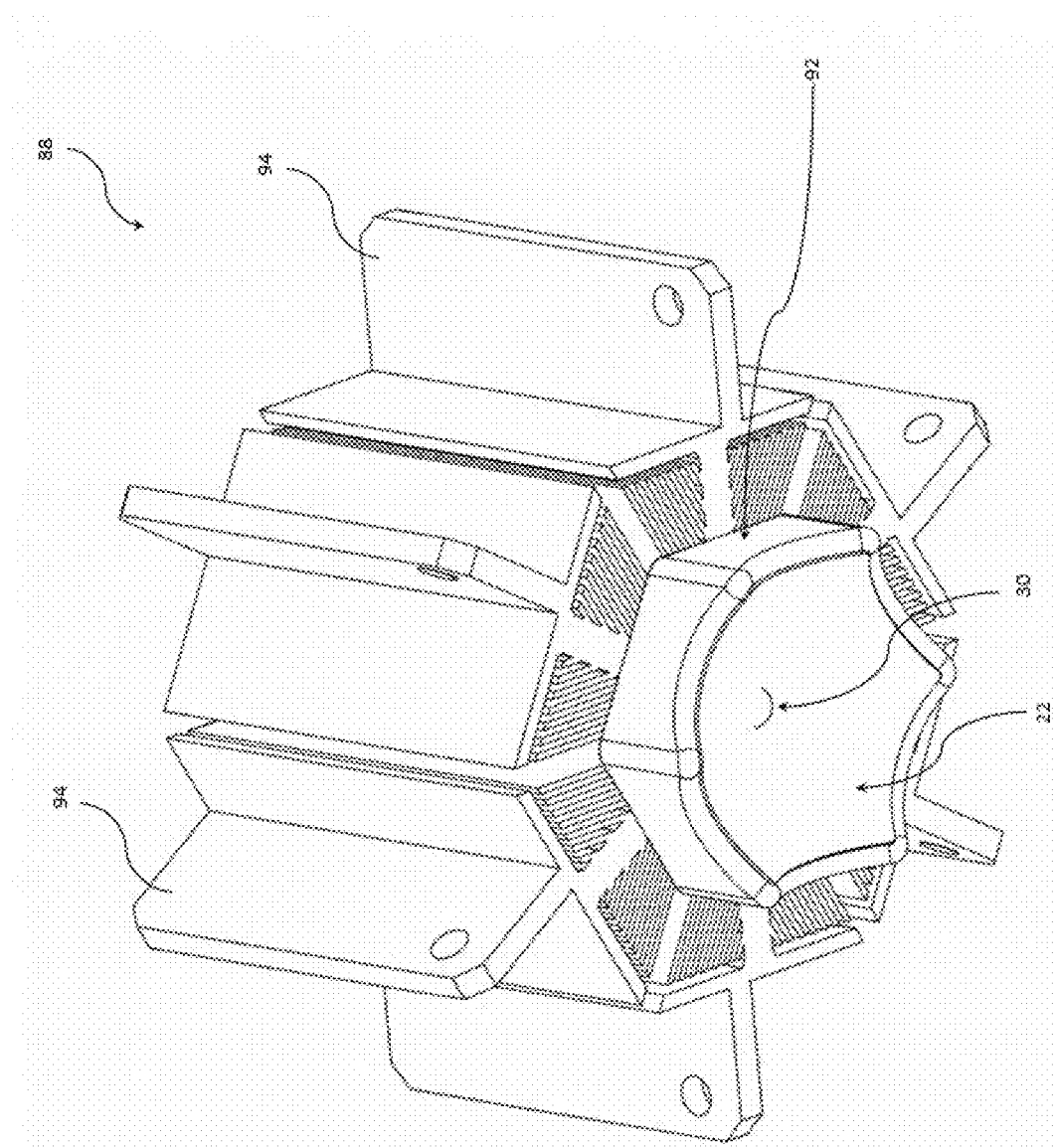
FIG. 10 is a bottom isometric view of the lighting device of FIG. 9.

In an embodiment shown in FIGS. 9-10, the lighting device 88 includes the same structure, functionality and elements as lighting device 10 except that: (a) the sidewall 36 is discontinuous and formed by a plurality of T-shaped sidewall segments 90 separated by a gap or radial heat transfer passage 80; and (b) the light source 22 has a light source housing 92 which holds the circuit board 26 (FIG. 4). The radial heat transfer passages 80 enable the air portion 84 of the up-rising air 58 (FIG. 5) to exit laterally or radially through the sidewall 36. Each sidewall segment 90 has an interconnector or connection portion 94. The connection portions 94 extend radially or outwardly from the centrally-located primary conductor 32. In the embodiment shown, each connector portion 94 is offset from the nearest spoke 38 to provide space for the thickness of the applicable arm 166 described below with respect to FIG. 28. The connection portions 94 function as heat transfer conductors while also functioning as connectors. In an embodiment, each connection portion 94 defines a fastener receiving opening 96 configured to receive a fastener, such as a bolt, screw, pin or clip. In an example, such fastener is connectable to an arm or connection rod which, in turn, is connectable to another fastener which, in turn, is connectable to the connection portion 94 of another lighting device 88. This enables installers or assemblers to assemble a plurality, cluster or array of lighting devices 88, as described below.

Figure 11:
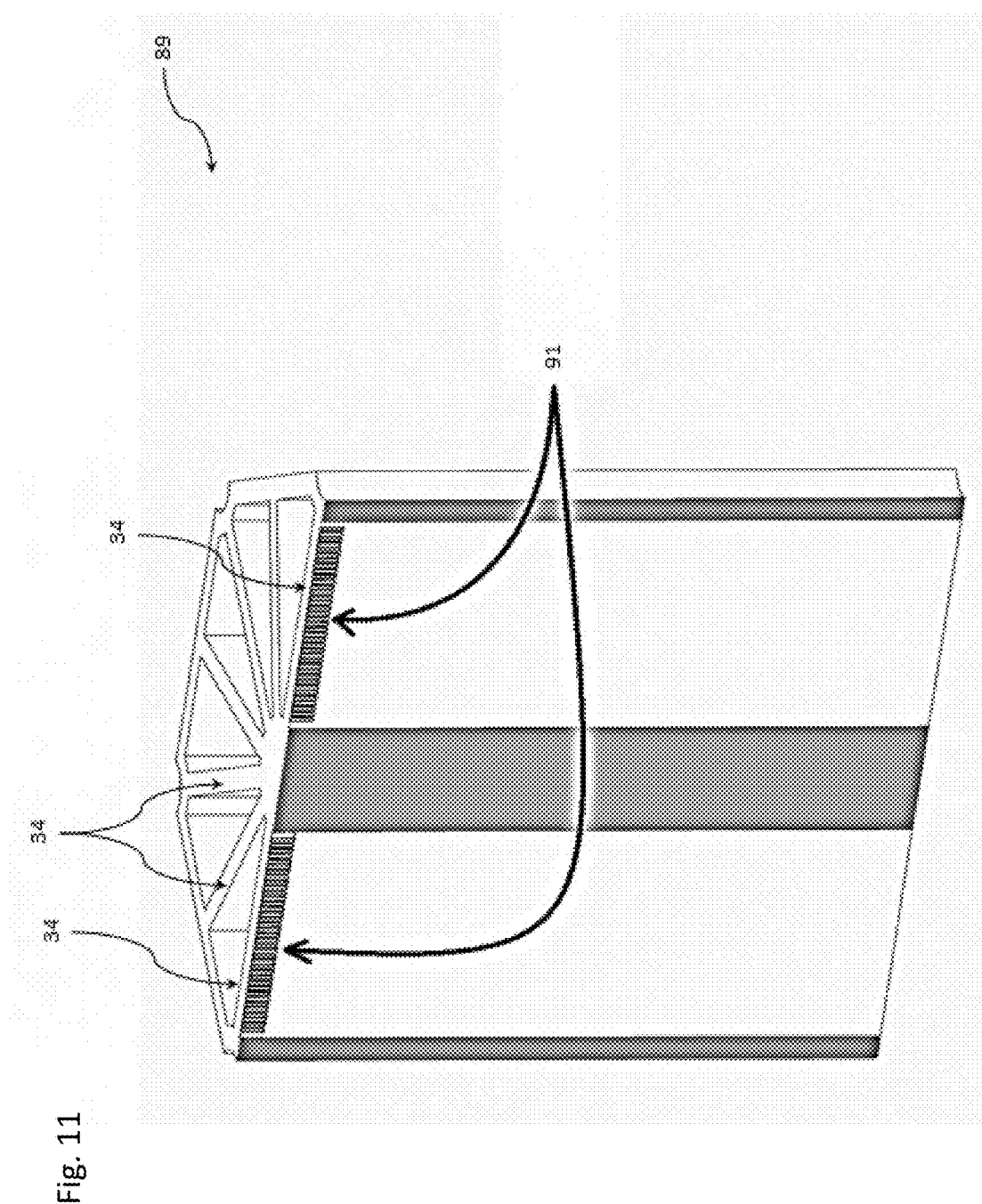
FIG. 11 is an isometric view of the internal components of an embodiment of a lighting device.

In an embodiment illustrated in FIG. 11, the lighting device 89 has the same structure, functionality and elements as lighting device 10, 64, 66, 76 or 88 except that lighting device 89 includes an ionic fluid mover 91 mounted to a plurality of the fins or secondary conductors 34. The ionic fluid mover 91 includes a plurality of pointy or thin conductor tips operable to generate electrostatic forces. The electrostatic forces ionize the air surrounding the conductor tips. The ionized air molecules have the same polarity as the conductor tips, causing the tips to repel the like-charged ions. The repulsion of the ions causes electric or ion wind or airflow. In an embodiment, the ionic fluid mover 91 includes one or more dielectric barrier discharge plasma actuators to generate such ion wind. As described below, the ionic fluid mover 91 is operable to enhance or facilitate the flow of air upward or downward through the lighting device 89. Also, the ionic fluid mover 91 is operable to neutralize or deactivate atmospheric chemicals, including, but not limited to, odiferous chemicals, and the ionic fluid mover 91 is operable to kill airborne pathogens.

Figure 12:
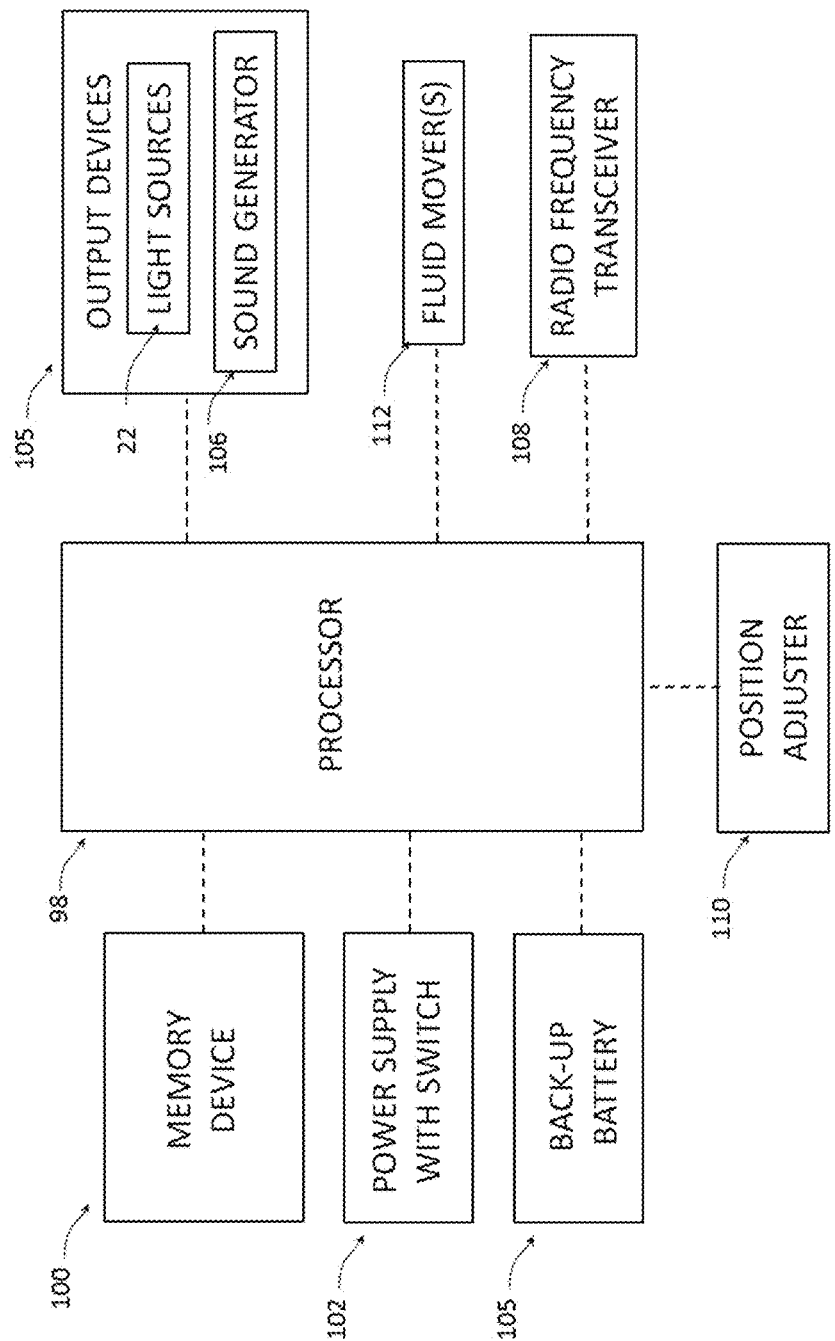
FIG. 12 is a schematic diagram of an embodiment of the electronic configuration of a lighting device.

In an embodiment, each of the lighting devices 10, 64, 66, 76, 88, 89 has the electronic configuration illustrated in FIG. 12. The circuit board 26 (FIG. 4) includes: (a) a processor 98, such as a central processing unit; and (b) a memory device 100 operatively coupled to the processor 98 which stores machine-readable instructions to direct the operation of the lighting device 10, 64, 66, 76, 88, 89. Each lighting device 10, 64, 66, 76, 88, 89 also includes: (a) a power supply module 102, operatively coupled to the processor 98, having a power transformer and an on/off switch or gate; (b) a back-up, rechargeable battery unit 104 operatively coupled to the power supply module 102; (c) a plurality of output devices 105, including the light source 22 and an audio output device, speaker or sound generator 106; and (d) a radio frequency (RF) antenna or RF transceiver 108 operatively coupled to the processor 98. In an embodiment, the RF transceiver 108 is configured to generate magnetic fields or RF signals according to the Bluetooth® protocol, which, for example, can include the generation of RF signals which occupy a section of the 2.4 GHz ISM band that is 83 MHz-wide.

As described below, in an embodiment, each lighting device 10, 64, 66, 76, 88, 89 also includes: (a) a motorized repositioning mechanism or electromechanical position adjuster 110 operatively coupled to the processor 98 to facilitate the lowering and raising of the lighting device; and (b) a motorized blower, fan or other type of fluid mover 112 (including, but not limited to, ionic fluid mover 91) operatively coupled to the processor 98 to push air through the lighting device or draw air through the lighting device.

2. Lighting Assemblies

Figure 13:
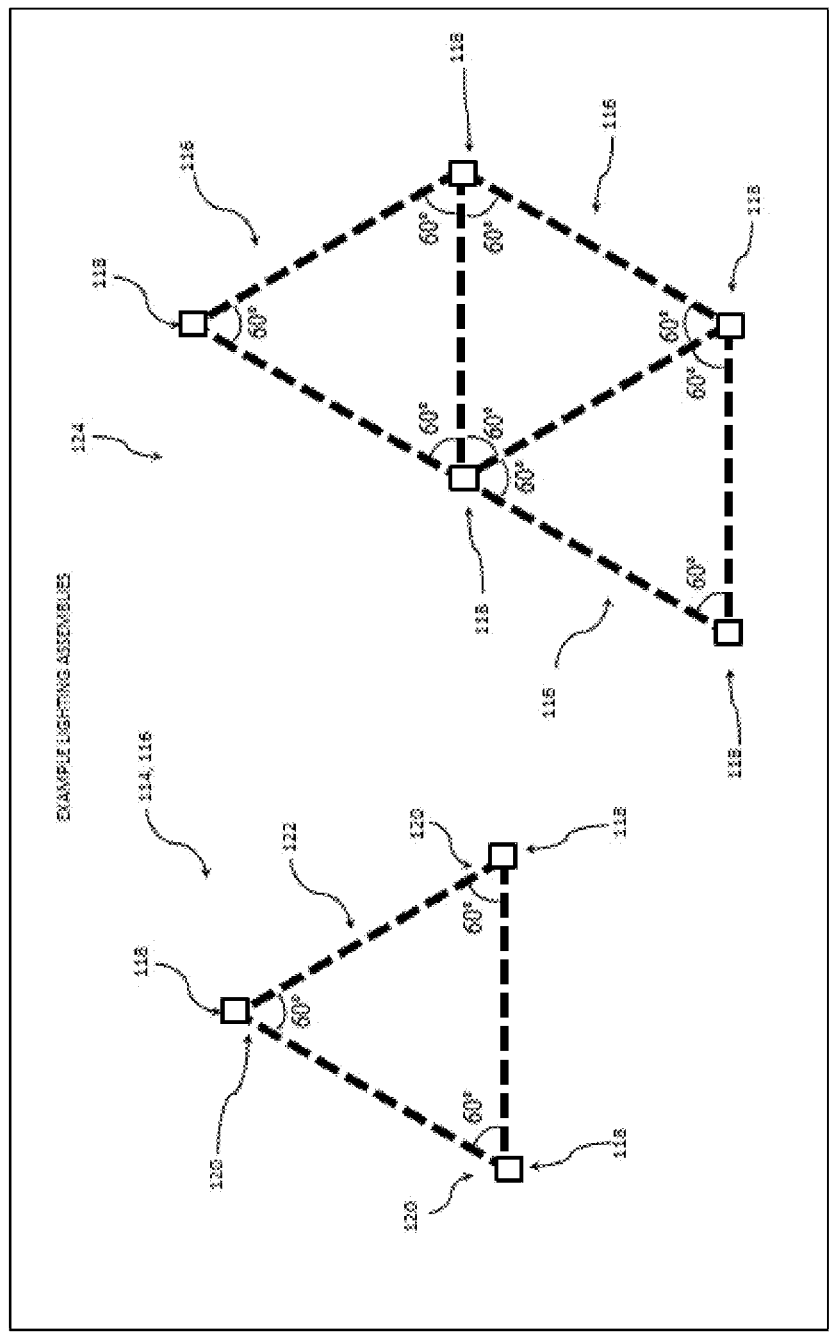
FIG. 13 is a schematic diagram of examples of lighting assemblies.

As described above, each lighting device 10, 64, 66, 76, 88, 89 is configured or structured to be physically connected to one or more additional lighting devices 10, 64, 66, 76, 88, 89 to form a cluster or array. In an embodiment shown in FIG. 13, the lighting assembly 114 includes a tri-set 116 of three lighting devices 118. Depending upon the embodiment, each lighting device 118 can be lighting device 10, 64, 66, 76, 88 or 89. In the tri-set 116, a lighting device 118 is located at each point or vertex 120 of an equilateral triangle 122. Accordingly, the interior angle at each vertex 120 is sixty degrees, as shown. The equidistance between the lighting devices 118 facilitates advantageous lighting effects, as described below. In another embodiment shown in FIG. 13, lighting assembly 124 includes a plurality of tri-sets 116.

Figure 14:
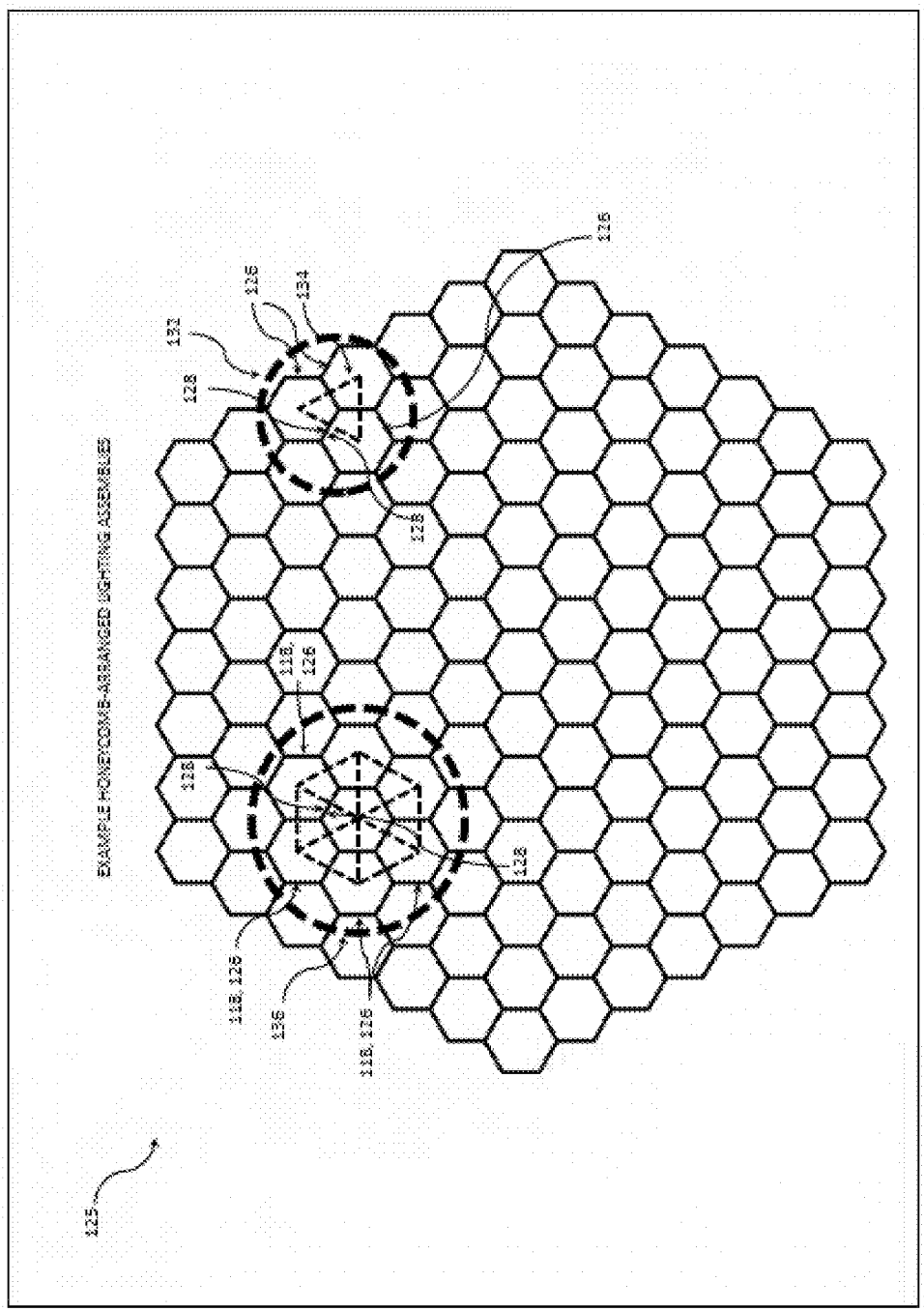
FIG. 14 is a schematic diagram of example honeycomb-arranged lighting assemblies.

Referring to FIG. 14, a honeycomb pattern 125 includes a plurality of hexagons 126. The faces 128 of the hexagons 126 are in contact with each other, as shown. In the honeycomb pattern 125, the centers of three hexagons 126 which are in contact with each other, such as hexagons 132, are located at the vertices of an equilateral triangle 134. In an embodiment, lighting assembly 136 includes a plurality of lighting devices 118, as illustrated in FIG. 14. In this embodiment, the sidewall 36 (FIG. 5) of each lighting device 118 forms a hexagonal shape with six faces 128. In the example shown, the lighting assembly 136 includes seven lighting devices 118, and the light source 22 (FIG. 5) of each lighting device 118 is located at a center of a hexagon 126. The equal distance between several of lighting devices 118 facilitates advantageous lighting effects, as described below.

Figure 15:
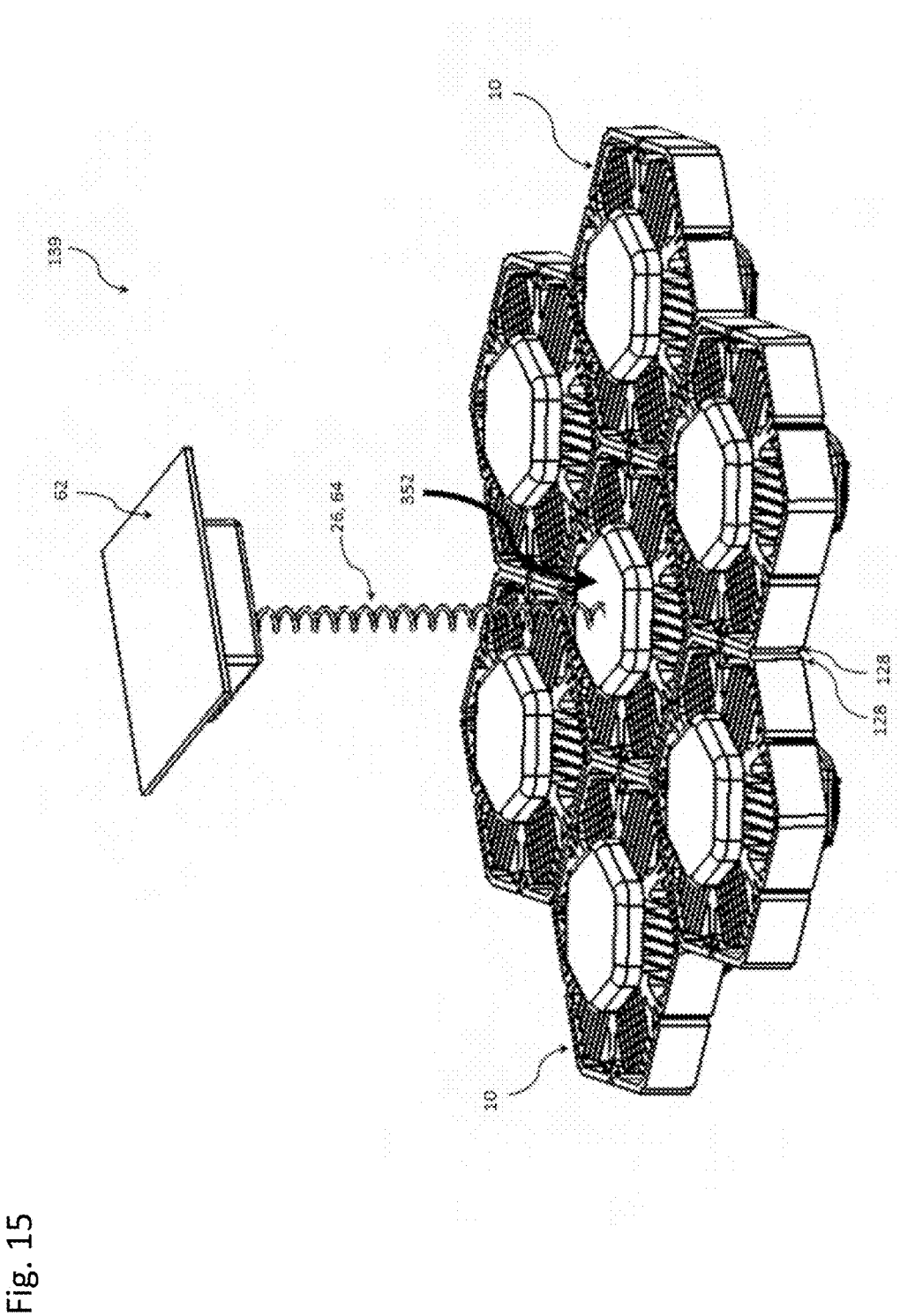
FIG. 15 is a top isometric view of an embodiment of a lighting assembly.
Figure 16:
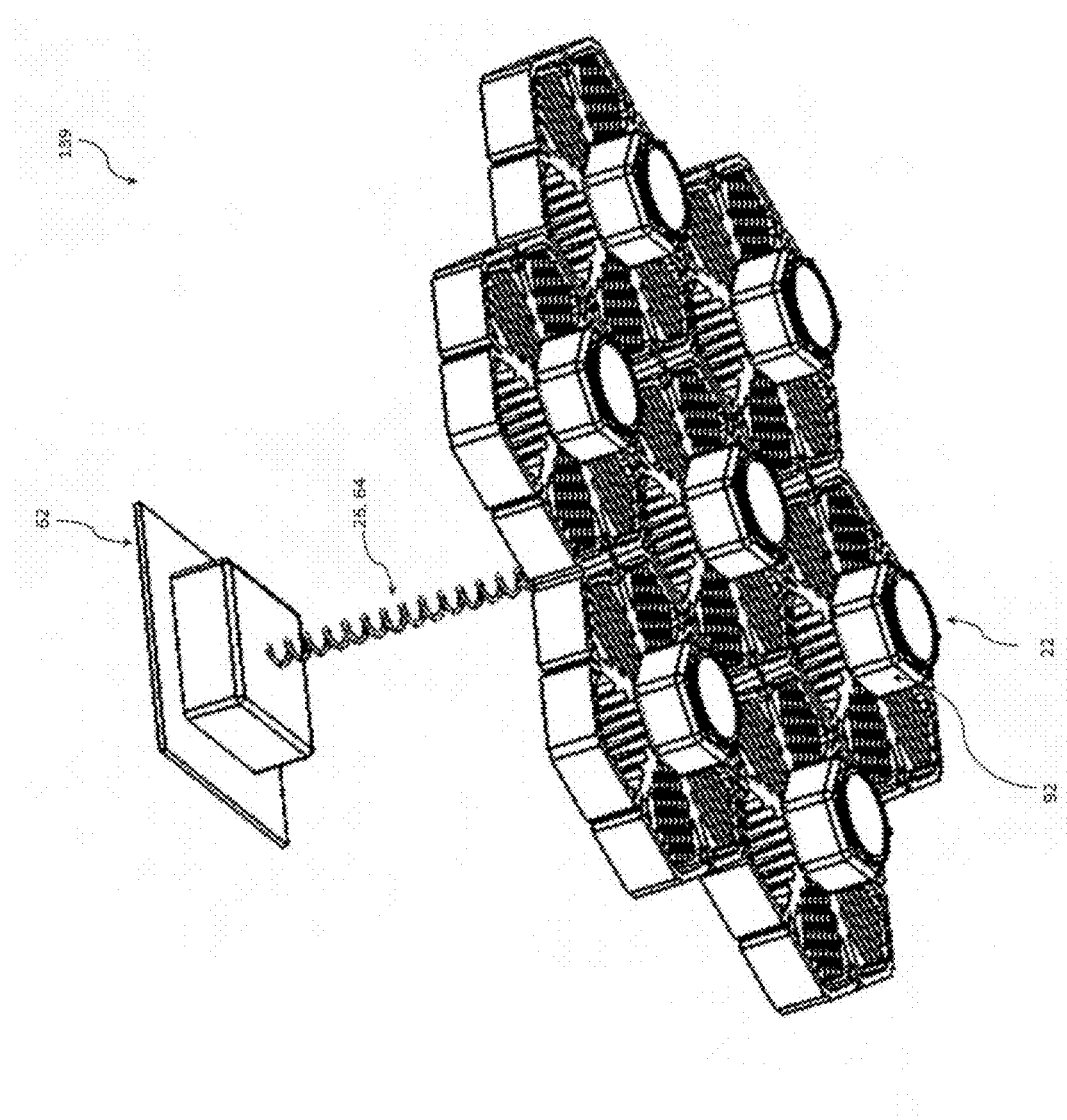
FIG. 16 is a bottom isometric view of the lighting assembly of FIG. 15.
Figure 17:
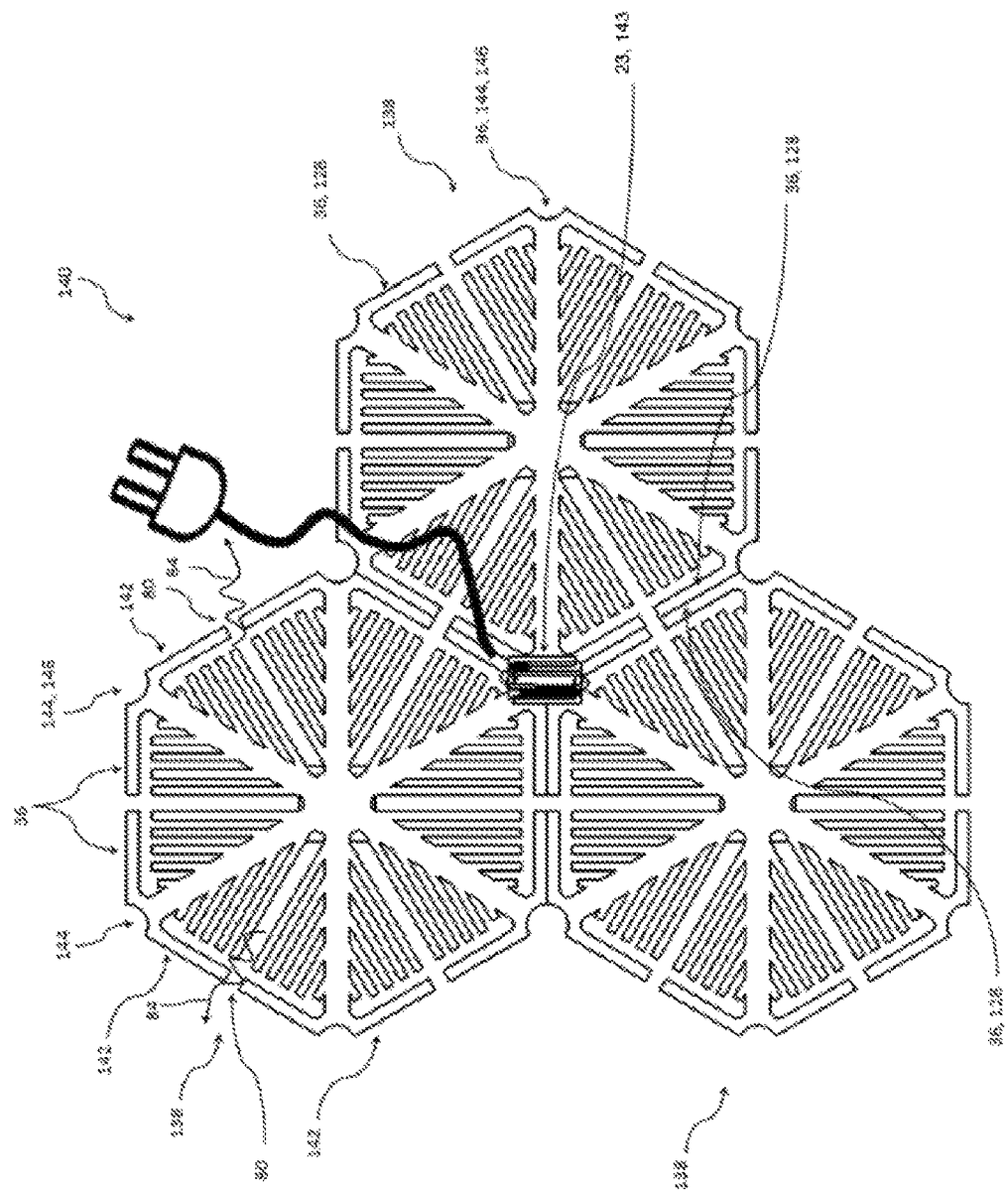
FIG. 17 is a top view of an embodiment of a lighting assembly.
Figure 18:
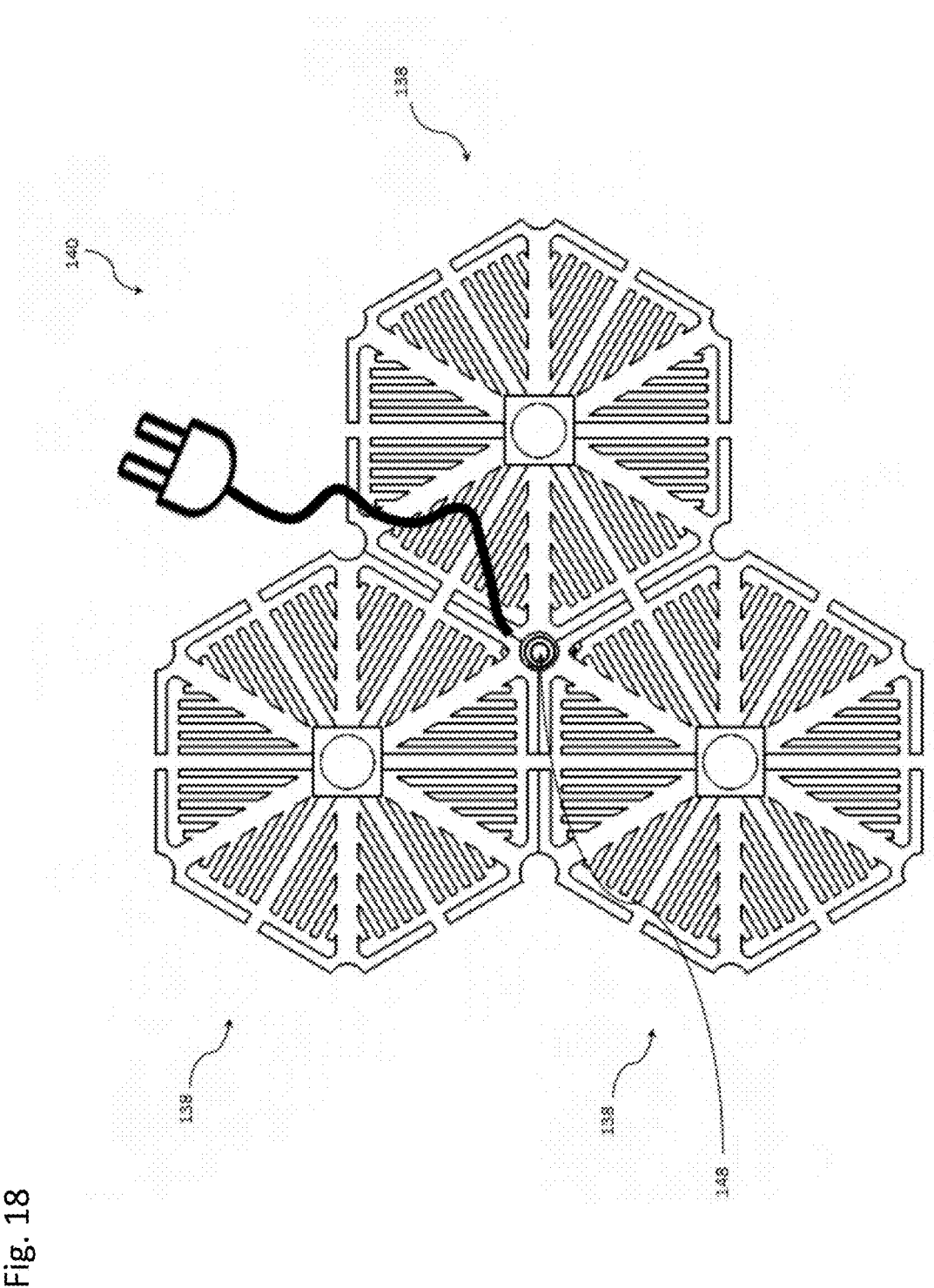
FIG. 18 is a bottom view of the lighting assembly of FIG. 17.
Figure 19:
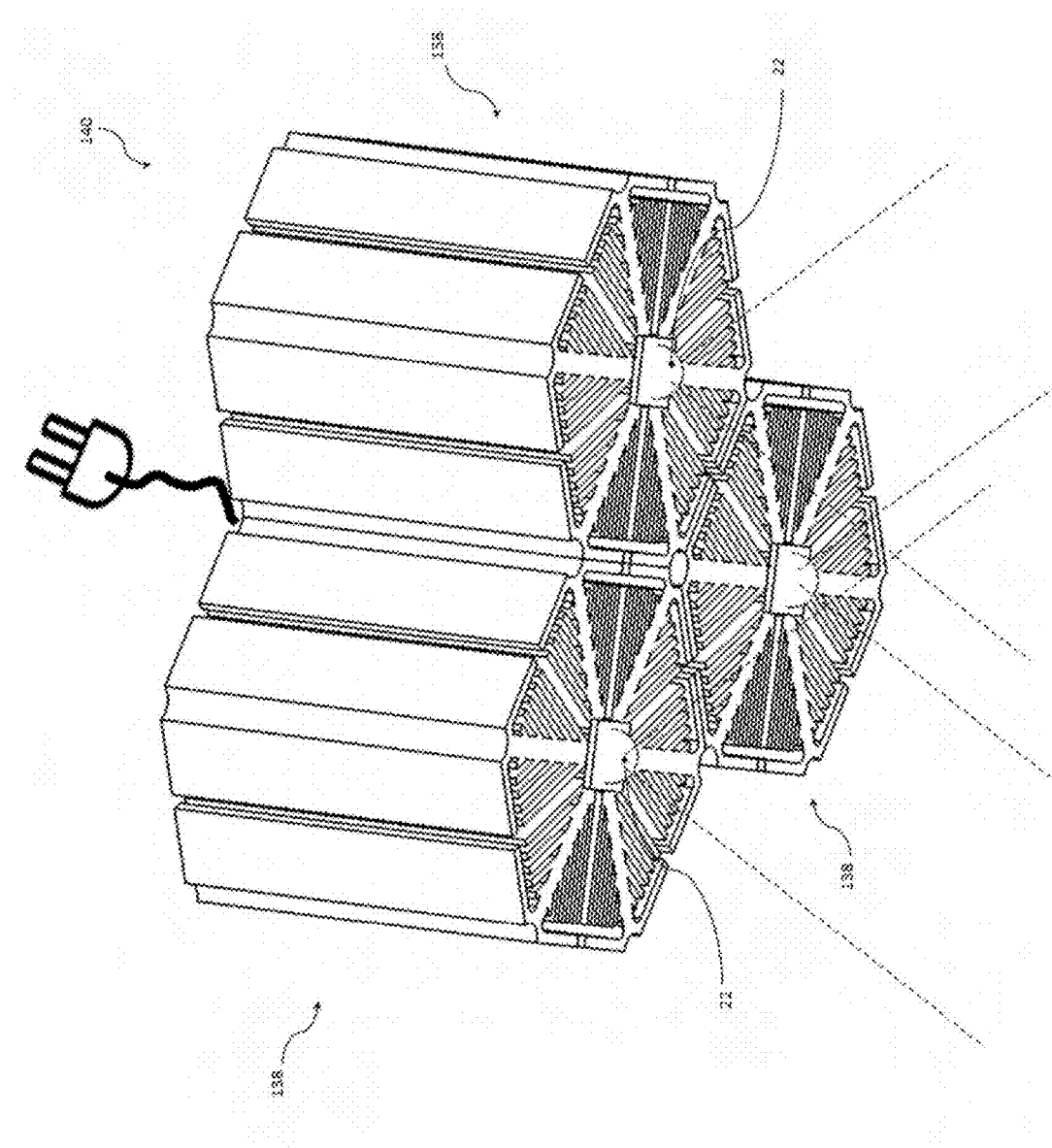
FIG. 19 is a bottom isometric view of the lighting assembly of FIG. 17.
Figure 20:
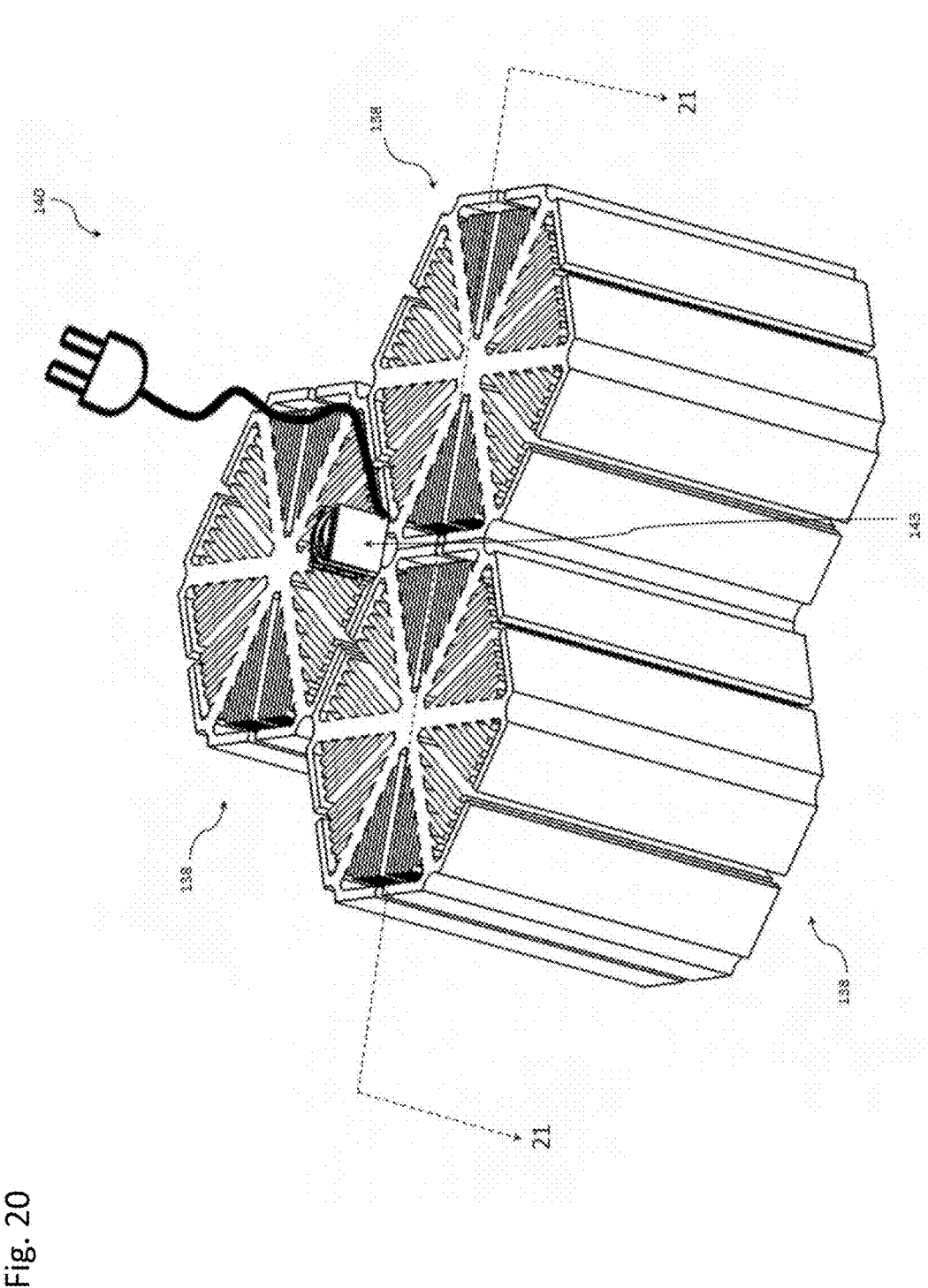
FIG. 20 is a top isometric view of the lighting assembly of FIG. 17.
Figure 21:
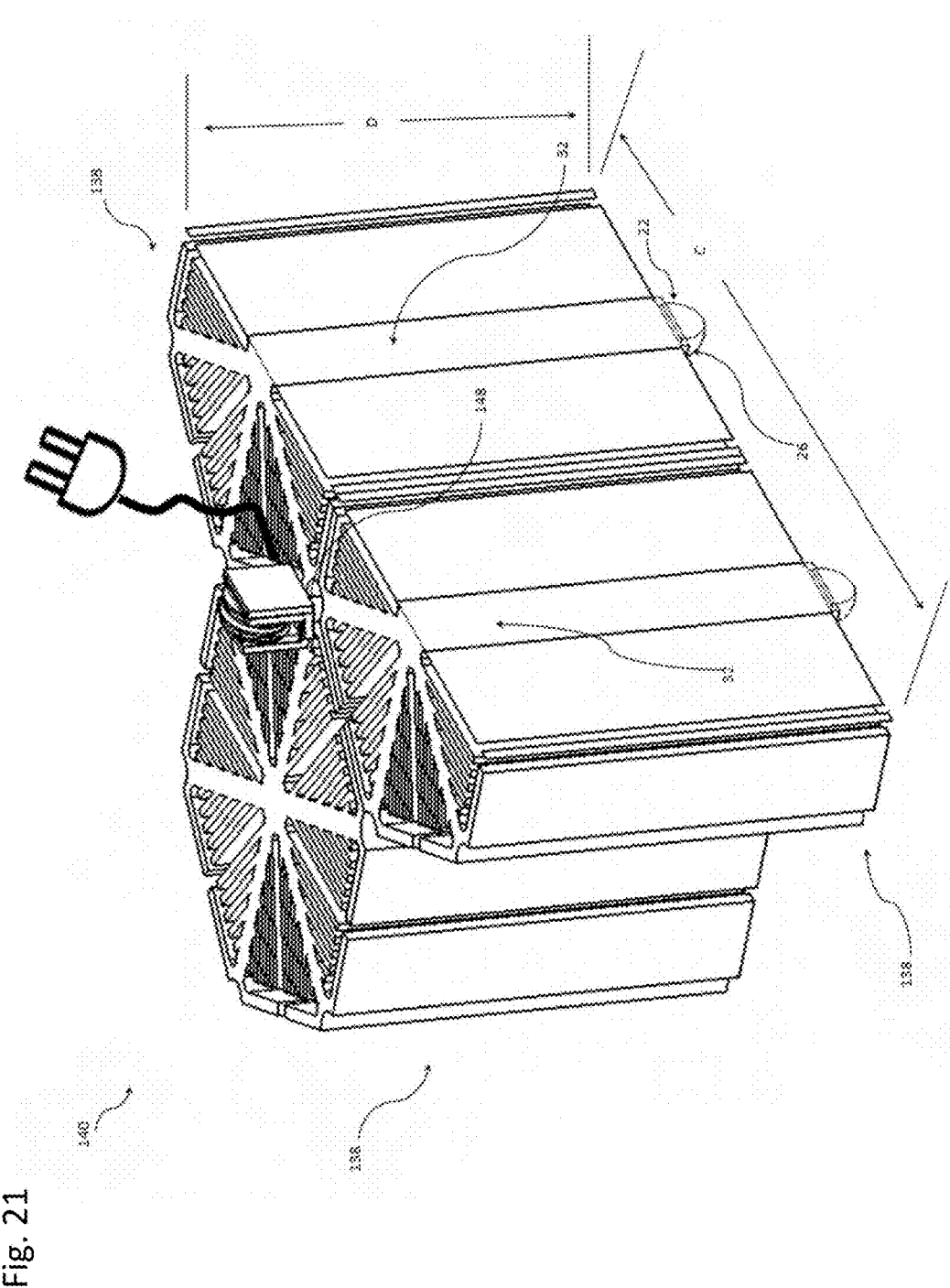
FIG. 21 is a cross-sectional, isometric view of the lighting device of FIG. 20, taken substantially along line 21-21.

In an embodiment shown in FIGS. 15-16, a plurality or set of hexagonal lighting devices 10 are directly connected to each other to form a lighting assembly 139. In this embodiment, the connection portions 68 (FIG. 2) mechanically connect the lighting devices 10 together through the use of suitable fasteners. In this embodiment, the faces 128 (FIG. 15) are in contact with each other according to the honeycomb pattern 125 shown in FIG. 14.

In an embodiment shown in FIGS. 17-21, a plurality or set of hexagonal lighting devices 138 are directly connected to each other to form a lighting assembly 140. In this embodiment, each lighting device 138 includes the same structure, functionality and elements as lighting device 10 except that: (a) the sidewall 36 is discontinuous and formed by a plurality of T-shaped sidewall segments 142 separated by a gap or radial heat transfer passage 80; (b) the coupler 23 includes a pulley 143 configured to connect to the line 64 (FIG. 1); (c) the ratio of the width C (FIG. 21) to height D (FIG. 21) can be 1/1, 1.5/1, 2/1 or greater than 2/1; and (d) the primary conductor 32 is elongated functioning as a vertical, conductive extension. The center of each sidewall segment 142 defines an interconnector or connection portion 144. The connection portions 144 are located at the six vertices 146 of each hexagonal lighting device 138. In this embodiment, the faces 128 are in contact with each other according to the honeycomb pattern 125 shown in FIG. 14.

In an embodiment, each connection portion 144 defines a fastener receiving opening 96 configured to receive a linear fastener 148 (FIG. 18), such as a threaded or non-threaded bolt, screw or pin. In the embodiment shown, the linear fastener 148 is connected to the pulley 143. In an example not shown, the linear fastener 148 is a threaded bolt. After inserted through the fastener receiving opening 96, a washer and nut are slid over the end of the bolt. As the nut is screwed onto the bolt, the three hexagonal lighting devices 138 are compressed and held together as a single unit. It should be appreciated that other approaches can be taken to secure the hexagonal lighting devices 138 together. For example, each face 128 of the sidewall 36 can include or define: (a) at least one radial projection (not shown); and (b) at least one vertical groove extending from the bottom of the hexagonal lighting device 138 but having an upper stop to prevent passing through the entire hexagonal lighting device 138. To connect two hexagonal lighting devices 138 together, an assembler can insert the radial projection into the slot.

Figure 22:
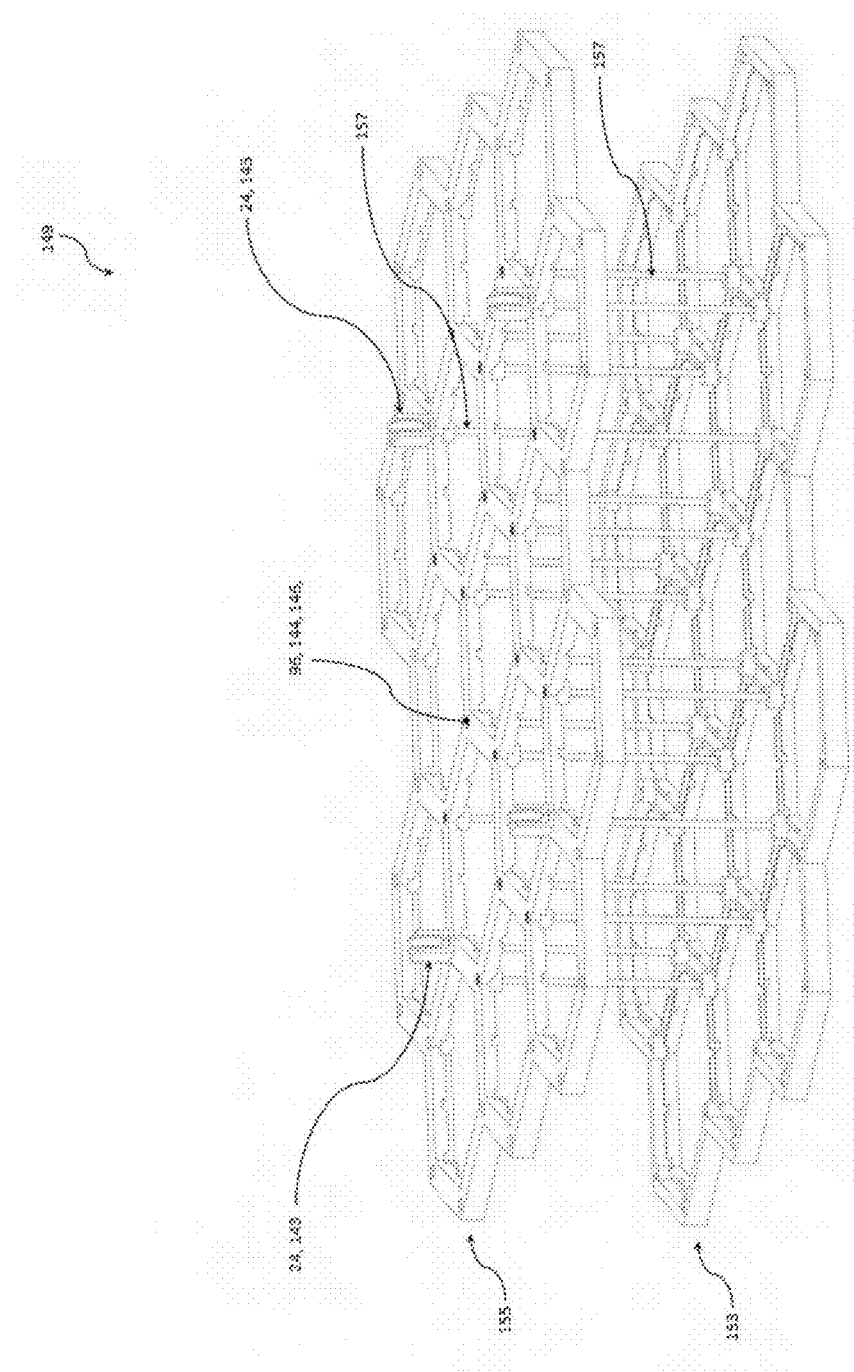
FIG. 22 is a top isometric view of an embodiment of an array frame.
Figure 23:
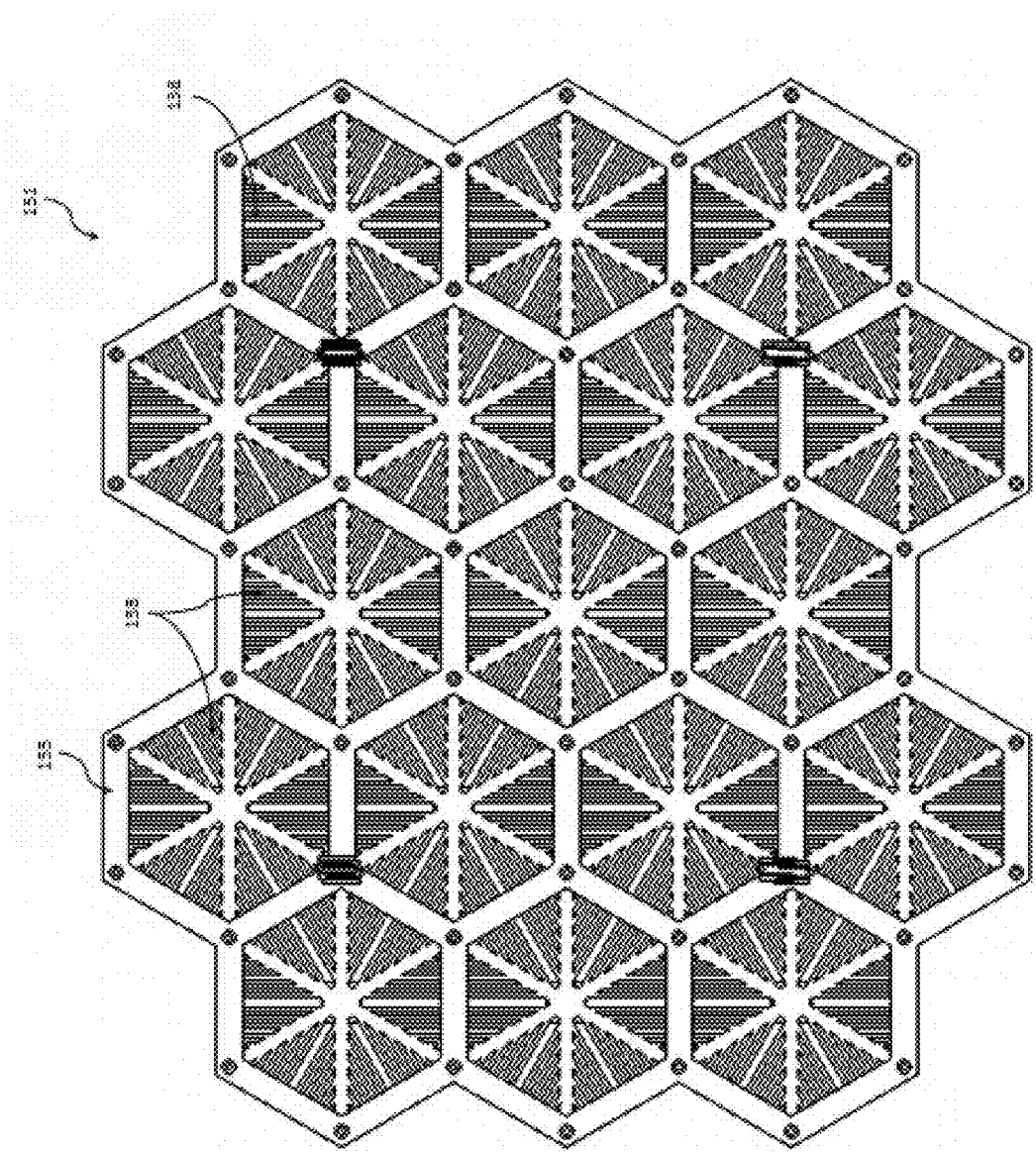
FIG. 23 is a top view of an embodiment of a framed lighting assembly.
Figure 24:
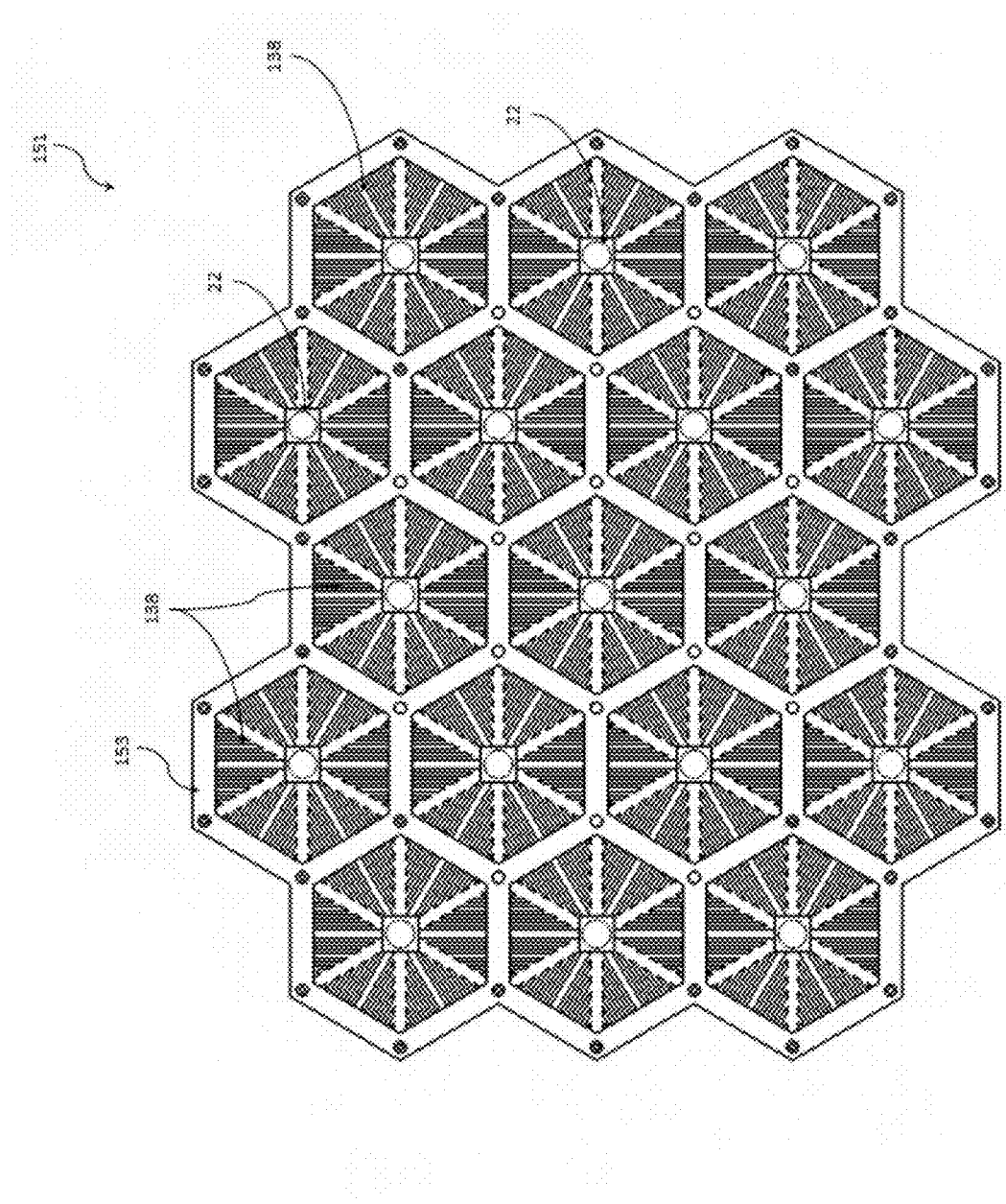
FIG. 24 is a bottom view of the framed lighting assembly of FIG. 23.

In an embodiment illustrated in FIGS. 22-24, an array frame 149 (FIG. 22) holds a plurality or array of hexagonal lighting devices 138 together to form a framed lighting assembly 151 (FIGS. 23-24). The array frame 149 includes: (a) a lower support structure 153 holding and supporting the hexagonal lighting devices 138; (b) an upper support structure 155 holding and supporting the hexagonal lighting devices 138 in a honeycomb pattern 125 (FIG. 14); and (c) a plurality of fasteners 157 (e.g., rods, bolts or pins) which connect the structures 153, 155 together and compress and secure the hexagonal lighting devices 138 between the structures 153, 155.

Figure 25:
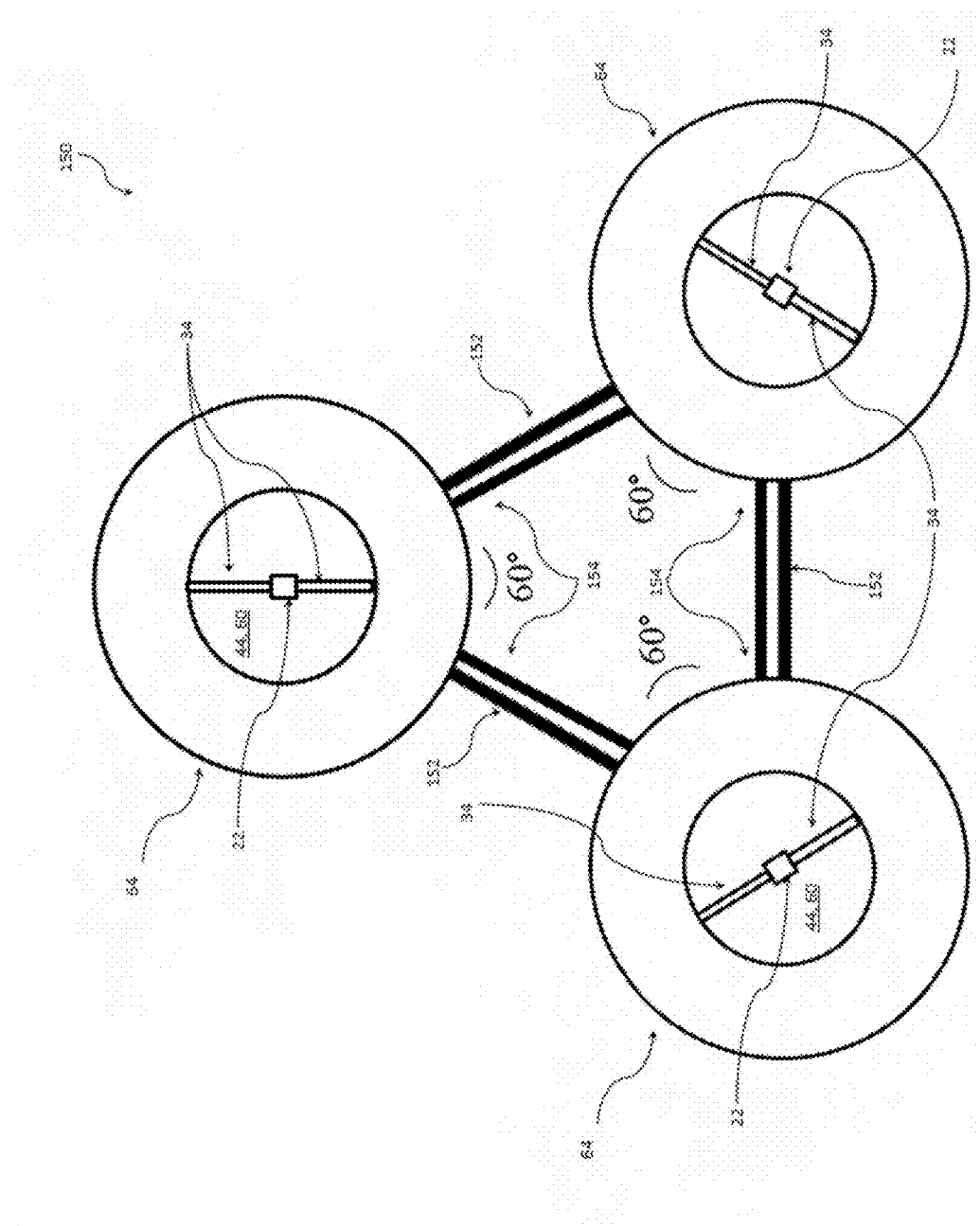
FIG. 25 is a schematic diagram of an embodiment of a lighting assembly.

In an embodiment illustrated in FIG. 25, a plurality or a tri-set of lighting devices 64 are connected to each other to form a lighting assembly 150. In this embodiment, the lighting assembly 150 includes a plurality of elongated couplers, linear or curvilinear connectors or arms 152, such as bars, rods, pipes or plates. Each arm 152 has a plurality of arm ends 154 configured or structured to be removeably attached, mounted or connected to the lighting devices 64. Through use of the arms 150, an assembler can form the triangular light source array 150 shown in FIG. 25. In this embodiment, the arms 150 are sized and shaped to arrange the lighting devices 64 in the shape of an equilateral triangle having a sixty degree angle in each corner of the triangle. The equidistance between the lighting devices 64 facilitates advantageous lighting effects, as described below.

Figure 26:
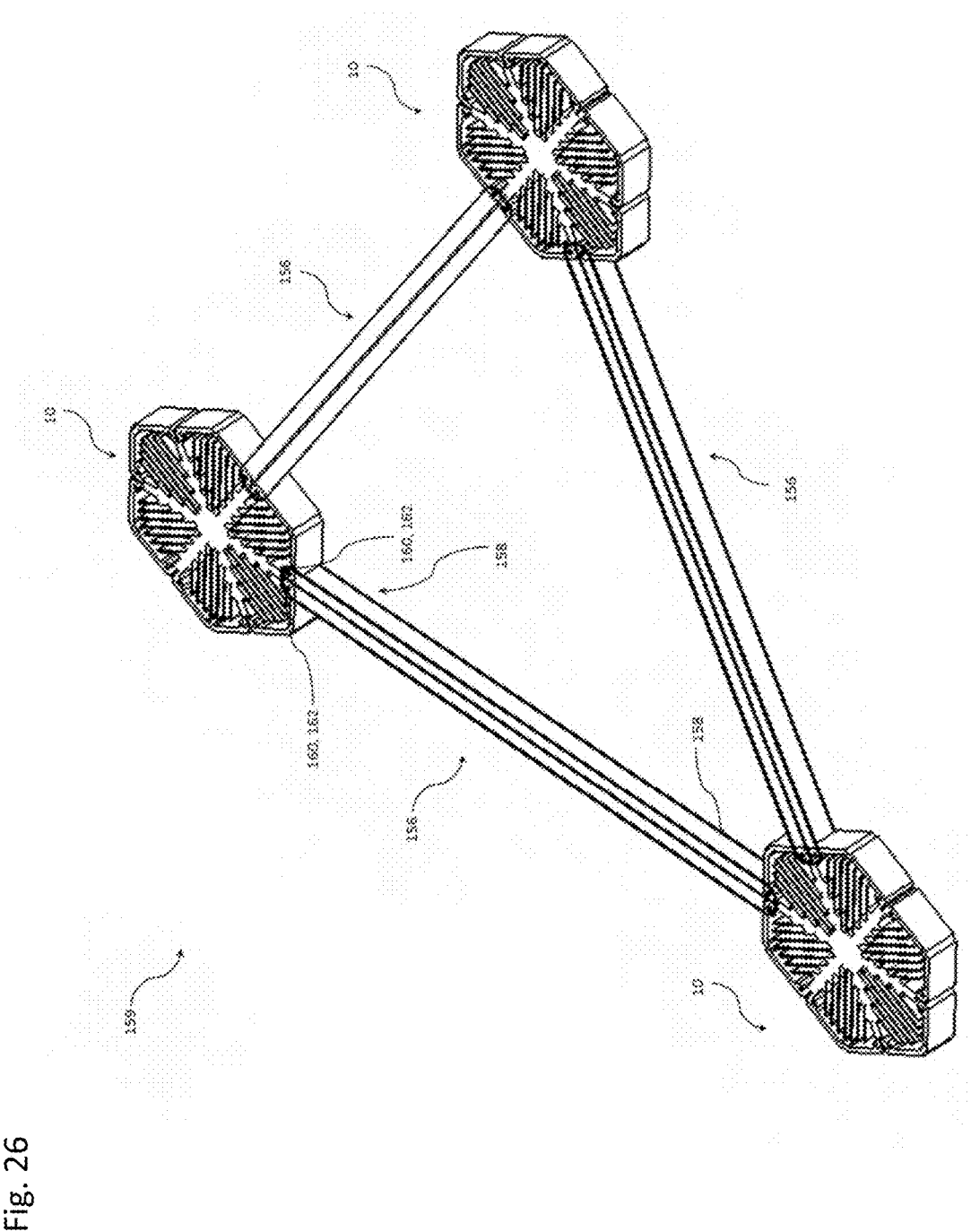
FIG. 26 is a top isometric view of an embodiment of a lighting assembly.
Figure 27:
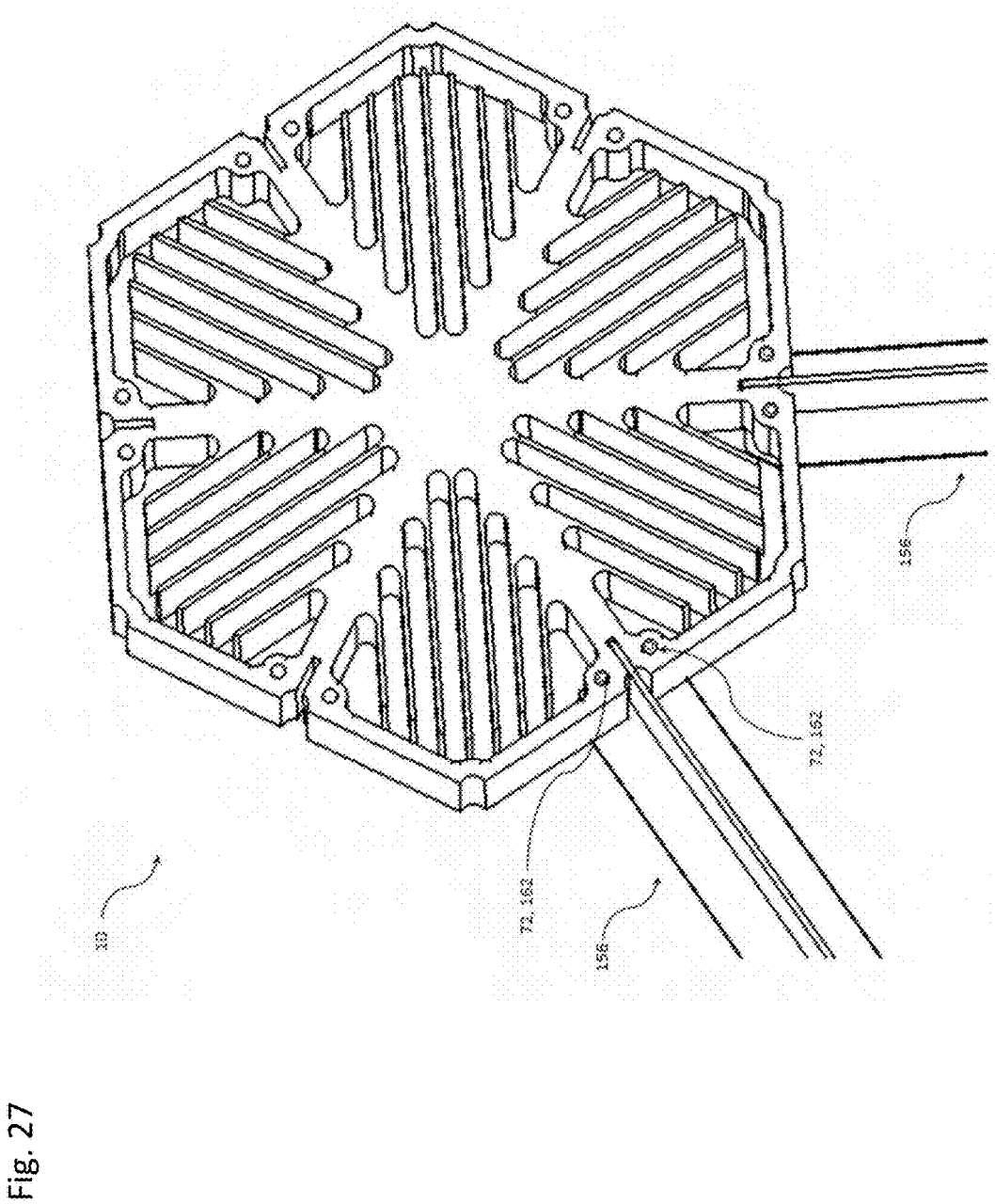
FIG. 27 is an enlarged, top view of a portion of the lighting assembly of FIG. 26.

As illustrated in FIGS. 26-27, a plurality or a tri-set of lighting devices 10 are connected to each other to form a lighting assembly 159. In this embodiment, the lighting assembly 159 includes a plurality of elongated couplers, linear or curvilinear connectors or arms 156, such as bars, rods, pipes or plates. Each arm 156 has a plurality of arm ends 158 configured or structured to be removeably attached, mounted or connected to the lighting devices 10. Each arm end 158 defines a plurality of openings or holes 160 which receive fasteners 162 (e.g., bolts, screws or pins) to secure the arm end 158 to the applicable lighting device 10. In one example, the fasteners 162 are threaded bolts, and the securing openings 72 (FIG. 2) are threaded to mate with such bolts. By bolting the arms 156 to the lighting devices 10, an assembler can form the triangular lighting assembly 159 shown in FIG. 25. In this embodiment, the arms 156 are sized and shaped to arrange the lighting devices 10 in the shape of an equilateral triangle having a sixty degree angle in each corner of the triangle. The equidistance between the lighting devices 10 facilitates advantageous lighting effects, as described below.

Figure 28:
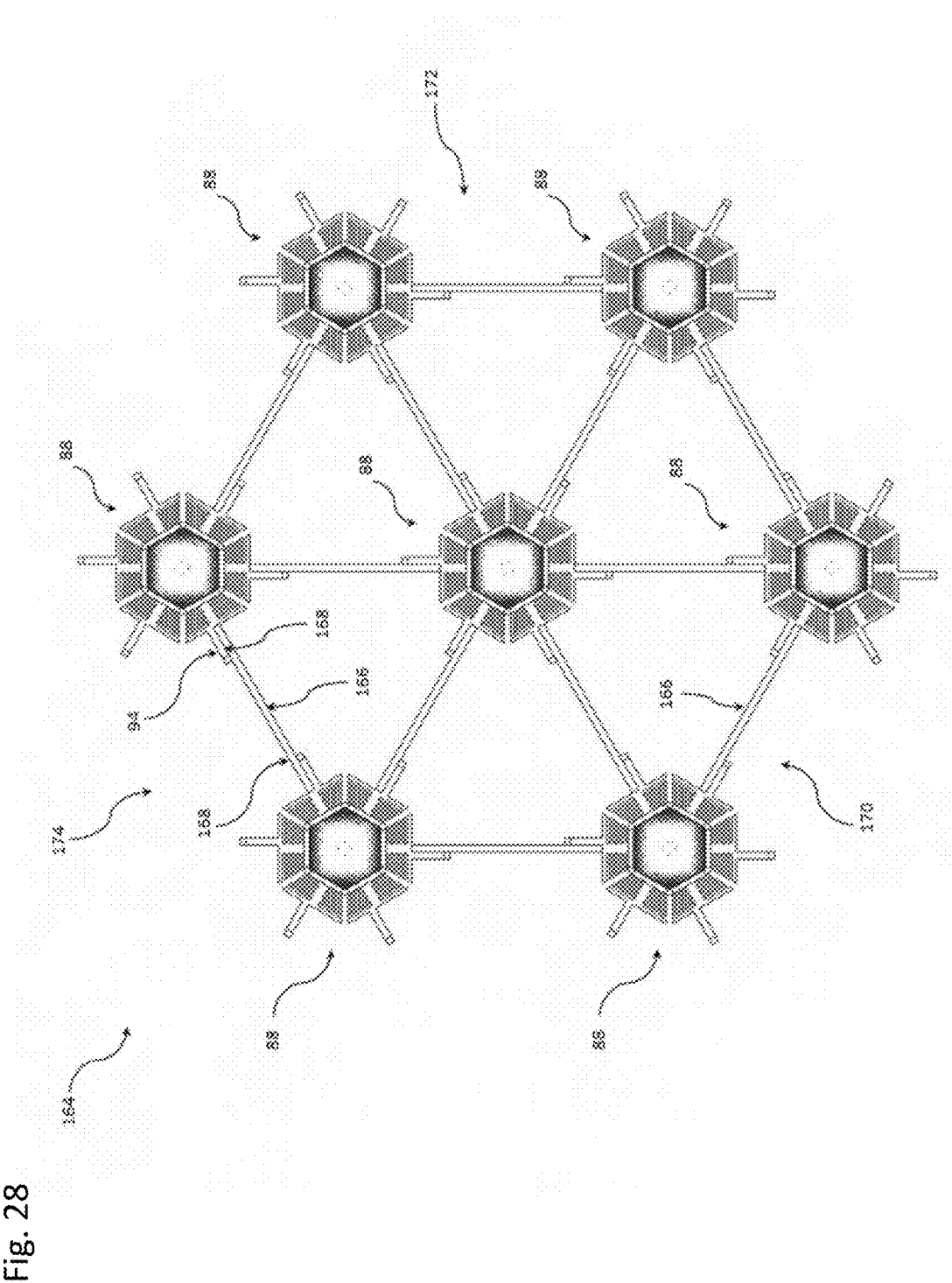
FIG. 28 is a top view of an embodiment of a lighting assembly.
Figure 29:
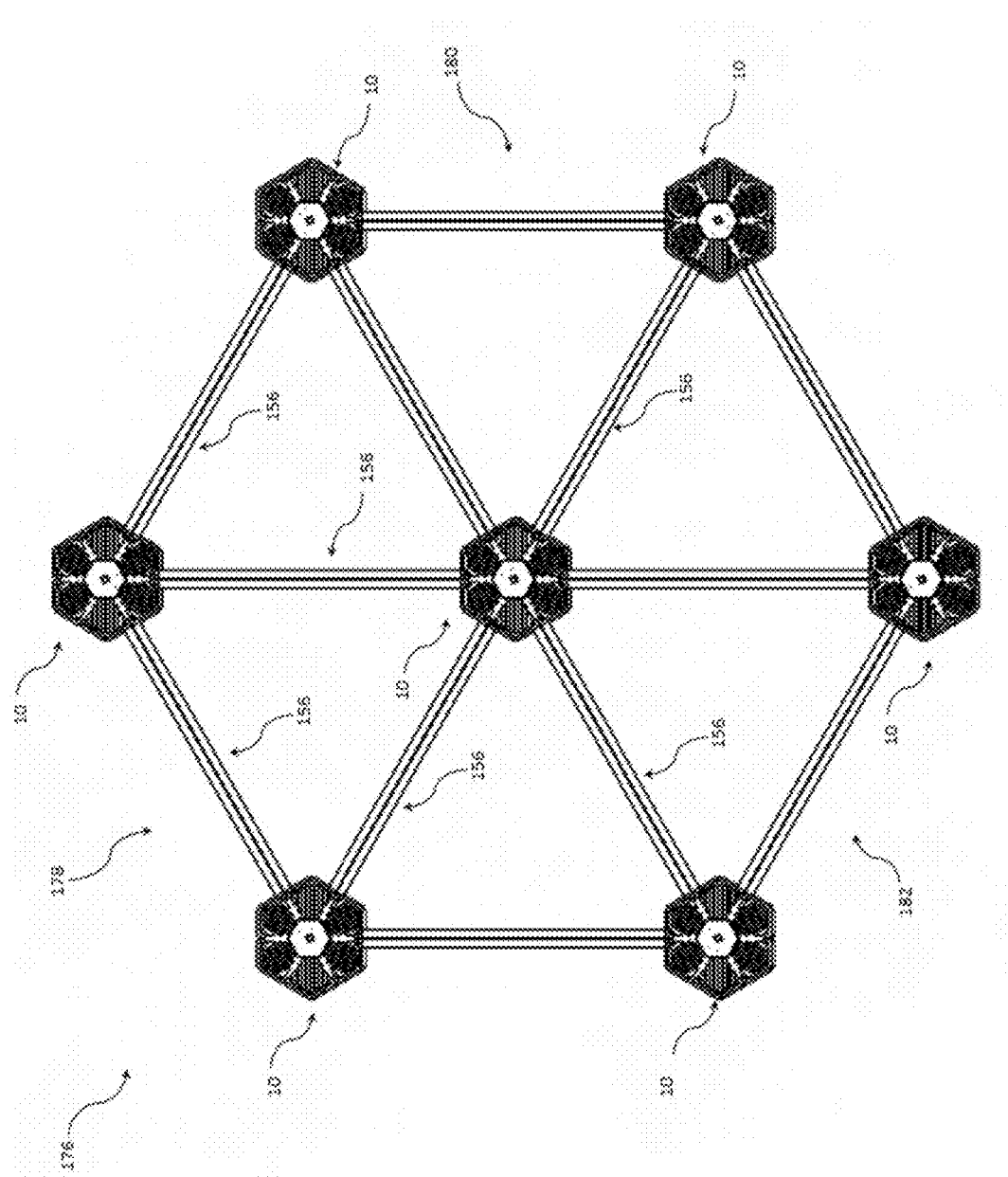
FIG. 29 is a top view of another embodiment of a lighting assembly.

As illustrated in FIGS. 28-29, the lighting devices can be assembled to form hexagonal arrays. In the example shown in FIG. 28, a plurality or a seven-unit set of lighting devices 88 are connected to each other to form a hexagonal lighting assembly 164. In this example, the hexagonal lighting assembly 164 includes a plurality of elongated couplers, linear or curvilinear connectors or arms 166, such as bars, rods, pipes or plates. Each arm 166 has a plurality of arm ends 168 configured or structured to be removeably attached, mounted or connected to the lighting devices 88. Each arm end 168 defines at least one opening or hole which receives a fastener (e.g., bolt, screw or pin) to secure the arm end 168 to the applicable lighting device 88. In an embodiment, the fastener is threaded and is inserted into the hole or opening 96 (FIG. 9) of the lighting device 88 and then secured with a washer and nut. By bolting the arms 168 to the lighting devices 88, an assembler can form the hexagonal lighting assembly 164 shown in FIG. 28. In this embodiment, the arms 168 are sized and shaped to arrange the lighting devices 88 at or close to vertices of equilateral triangles. The hexagonal lighting assembly 164 has an array or cluster of multiple tri-sets of lighting devices 88, including three tri-sets 170, 172, 174. The equidistance between the lighting devices 88 within each tri-set 170, 172, 174, facilitates advantageous lighting effects, as described below.

Figure 30:
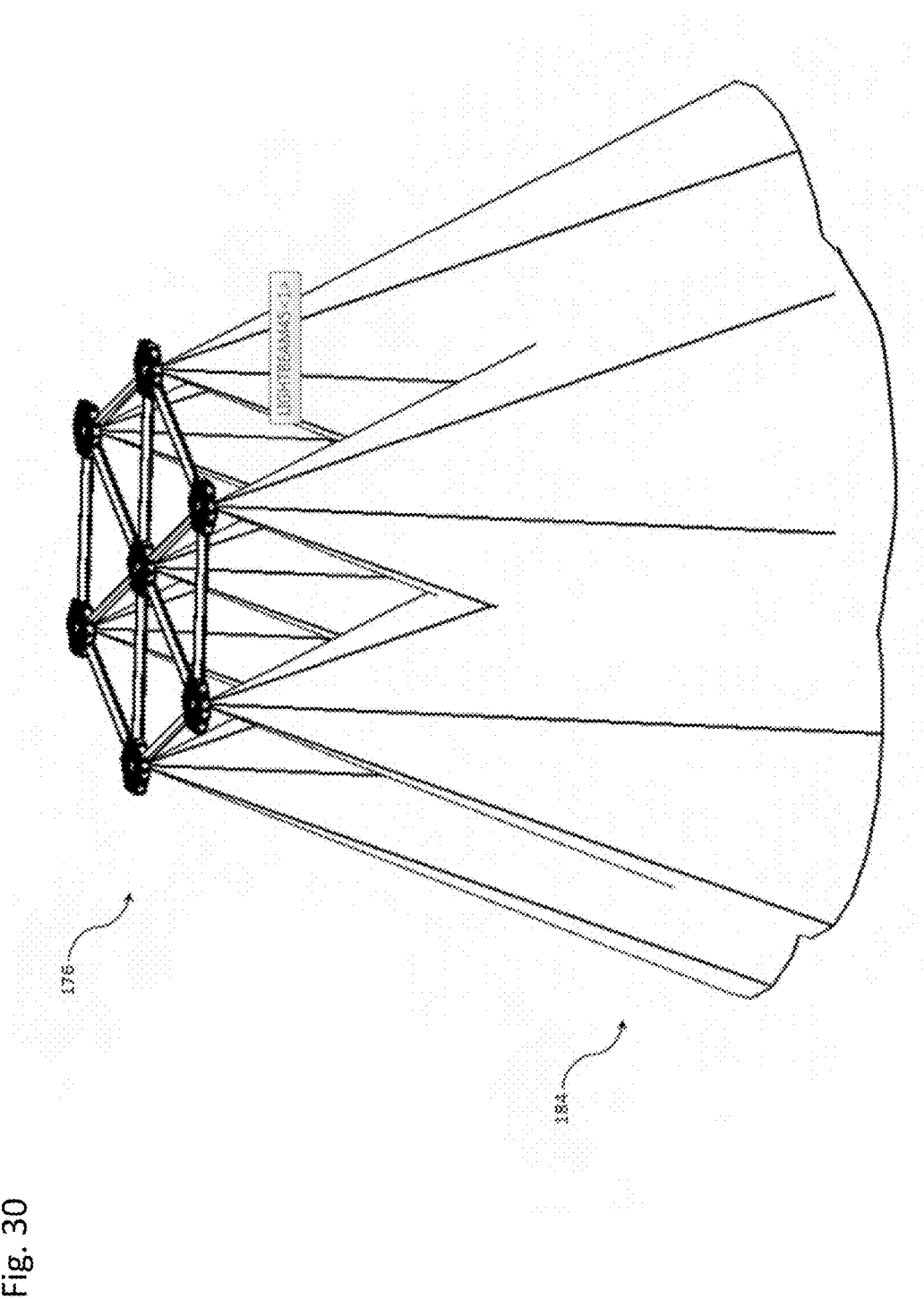
FIG. 30 is a top isometric view of the lighting assembly of FIG. 29, illustrating an example of its light pattern.

In the example shown in FIG. 29, a plurality or a seven-unit set of lighting devices 10 are connected to each other to form a hexagonal lighting assembly 176. In this example, the hexagonal lighting assembly 176 includes the arms 156 described above with respect to FIGS. 26-27. In this embodiment, the arms 156 are sized and shaped to arrange the lighting devices 10 at or close to vertices of equilateral triangles. The hexagonal lighting assembly 176 has an array or cluster of multiple tri-sets of lighting devices 10, including three tri-sets 178, 180, 182. The equidistance between the lighting devices 10 within each tri-set 178, 180, 182, facilitates advantageous lighting effects, as described below. In operation, the hexagonal lighting assembly 176 generates a light pattern 184, as illustrated in FIG. 30.

Figure 31:
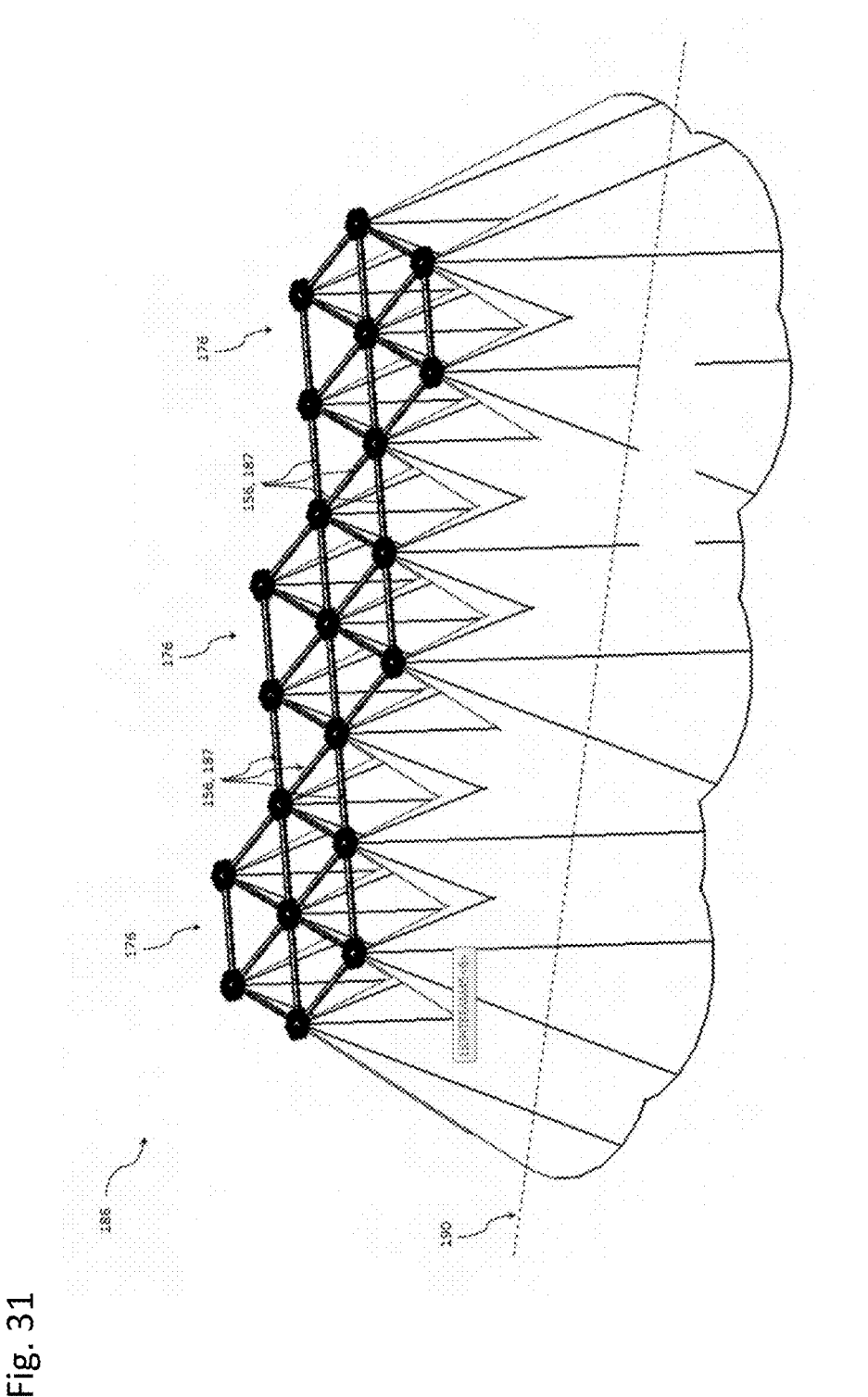
FIG. 31 is a top isometric view of an embodiment of an elongated lighting assembly, illustrating an example of its light pattern.

In the embodiment illustrated in FIG. 31, a plurality of the hexagonal lighting assemblies 176 are connected to each other to form a longitudinal or elongated lighting assembly 186. In this example, supplemental arms 187 are used to connect the hexagonal lighting assemblies 176 together. In operation, the elongated lighting assembly 186 generates a light pattern 188 which extends along a longitudinal axis 190.

Figure 32:
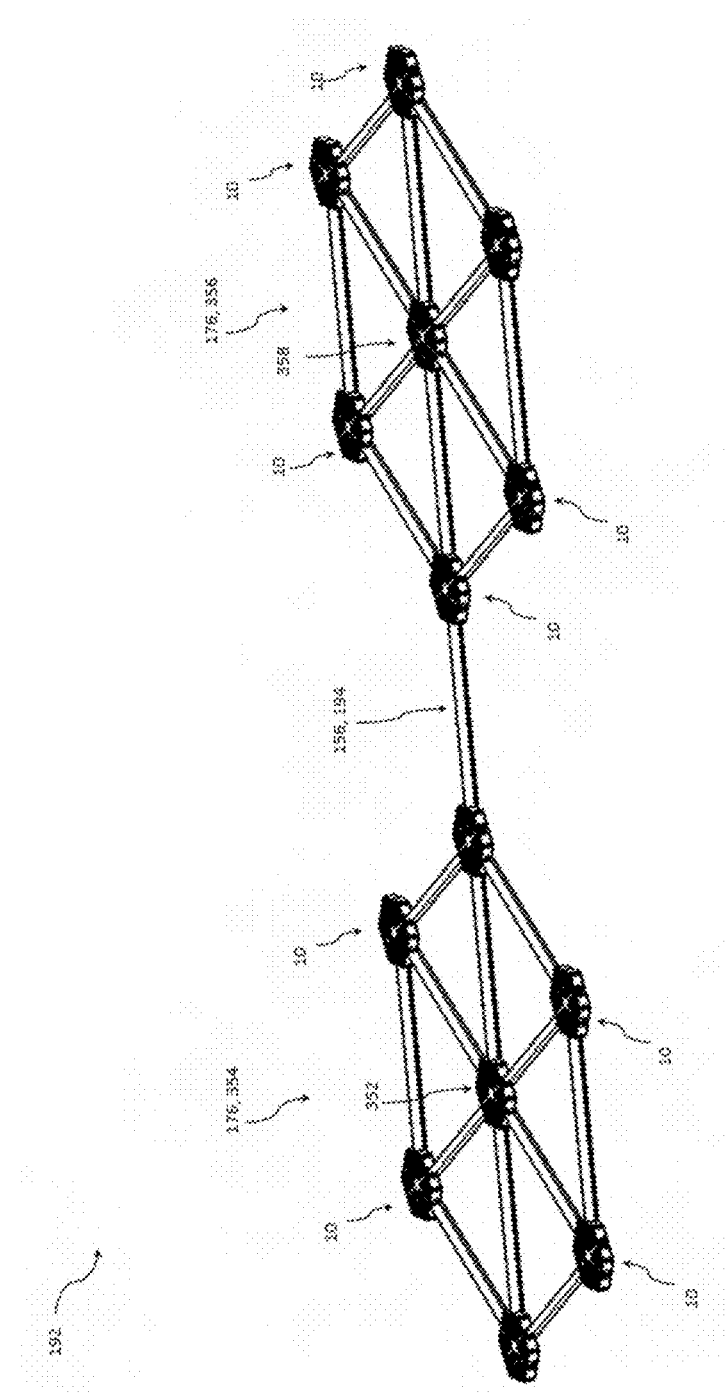
FIG. 32 is a top isometric view of an embodiment of a multi-zone lighting assembly.

In the embodiment illustrated in FIG. 32, a plurality of the hexagonal lighting assemblies 176 are connected to each other to form a two-gang, two-zone or multi-zone lighting assembly 192. In this example, the single supplemental arm 194 connects the hexagonal lighting assemblies 176 together.

3. Lighting Effects

Figure 33:
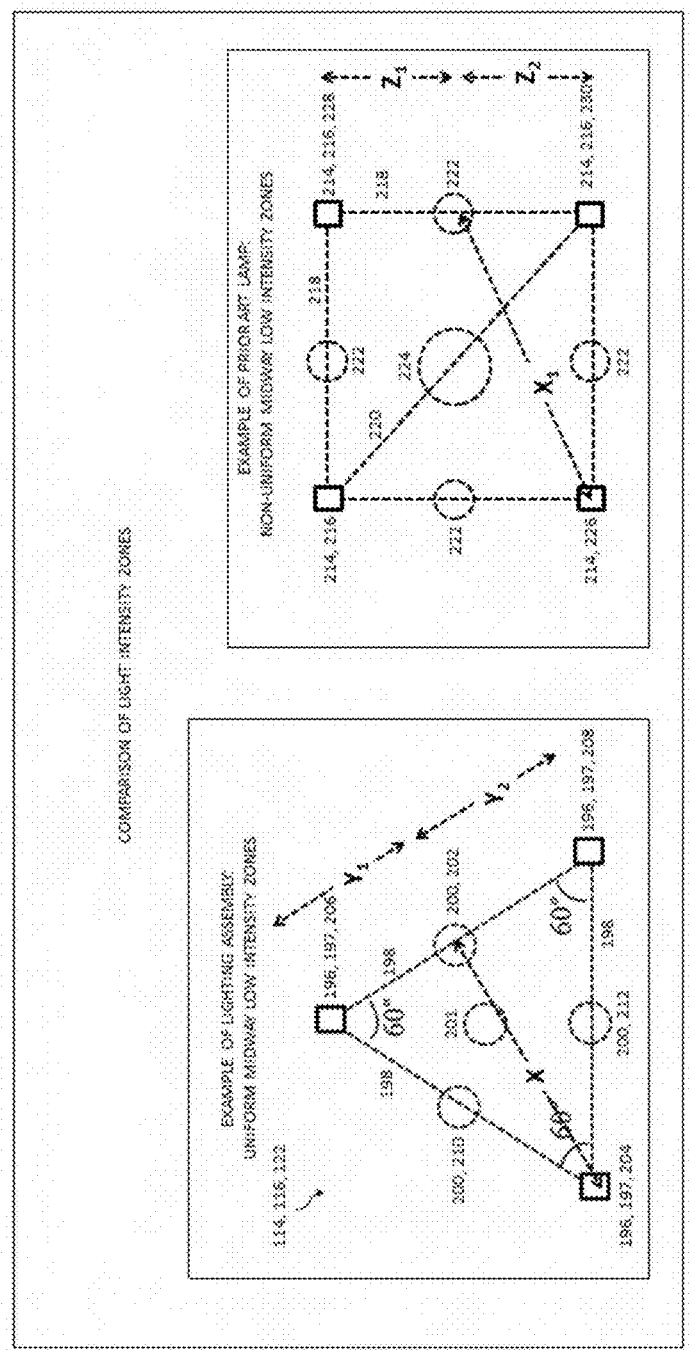
FIG. 33 is a schematic diagram illustrating an example of the performance of an embodiment of a lighting assembly compared to the performance of a prior art lamp.

Referring to FIG. 33, in an example, a plurality of point light sources 196 can be positioned at or close to vertices 197 of an equilateral triangle 122, as described above with respect to FIG. 13. This forms the lighting assembly 114, which includes a tri-set 116 of point light sources 196. In operation, each point light source 196 generates a light pattern emanating from the applicable vertex 197. The luminosity (e.g., watts per square meter), photon flux density (e.g., micromoles per square meter per second) or light intensity is highest at each of the vertices 197. The shortest distance between any two of the point light sources 196 is a straight line 198. At the middle of each straight line 198 is a midpoint surrounded by a three-dimensional midway low intensity zone 200. Within each midway low intensity zone 200, the light intensity is relatively low because of its location. For example, the midway low intensity zone 202 is located a relatively far distance X from point light source 204 and equal distances $Y_1$ and $Y_2$ from the nearest point light sources 206 and 208, respectively. This spacing applies for all three point light sources 196, causing each midway low intensity zone 200 to be equidistant from the two point light sources 196 located closest to it. Consequently, all three of the midway low intensity zones 200 have: (a) equal or substantially equal light intensities; and (b) equal or substantially equal light pattern profiles or sizes. This light uniformity among the three midway low intensity zones 200 aids in treating the plurality of items 12, 14, 16 (FIG. 1) with greater equality of light reception. For example, plant No. 1 may be located below midway low intensity zone 202, plant No. 2 may be located below midway low intensity zone 210, and plant No. 3 may be located below midway low intensity zone 212. Plant Nos. 1-3 would receive the same, or substantially the same, amount of light because of the increased light uniformity resulting from the triangular, equilateral arrangement of the point light sources 196. This uniformity or regularity simplifies the process of locating plants and other items to receive artificial light. Also, referring to FIG. 1, this increased light uniformity increases consistency in production, harvest or yield across an entire table 18, bed or tray supporting items 12, 14, 16.

Furthermore, the tri-set 116 has a center surrounded by a three-dimensional central low intensity zone 201. The distance between the center of central low intensity zone 201 and any one of the point light sources 196 is slightly greater than, and close to, the distance between the center of any one of the midway low intensity zones 200 and the nearest point light source 196. In one example, these two distances differ by approximately 15.5%. This percentage is based on the following mathematical formula: R=Y/Cosine(30 degrees), wherein R represents the distance from the center of central low intensity zone 201 to any one of the point light sources 196, and Y represents the distance between the center of any one of the midway low intensity zones 200 and the nearest point light source 196. Because of this minor light intensity variation, the lighting assembly 114 is operable to generate uniformity among zones 200 while also generating near or substantial uniformity among zones 200 and zone 201. This relative high degree of uniformity across the entire space below and between the point light sources 196 further simplifies the process of locating plants and other items to receive artificial light, thereby facilitating greater consistency in production, harvest or yield across an entire table 18, bed or tray supporting items 12, 14, 16.

With continued reference to FIG. 33, in an example of the known prior art, a prior art lamp has a plurality of point light sources 214 positioned at the corners 216 of a square, as shown. In operation, each point light source 214 generates a light pattern emanating from the applicable corner 216. The light intensity is highest at each of the corners 216. The shortest distance between any two of the point light sources 214 is a straight line 218 or hypotenuse line 220. At the middle of each straight line 218 is a midpoint surrounded by a three-dimensional midway low intensity zone 222. Also, at the middle of the hypotenuse line 220 is a midpoint surrounded by a three-dimensional midway low intensity zone 224. Within each midway low intensity zone 222, 224 the light intensity is relatively low because of its location. For example, the midway low intensity zone 222 is located a relatively far distance X1 from point light source 226 and equal distances $Z_1$ and $Z_2$ from the nearest point light sources 228 and 230, respectively.

Furthermore, because the hypotenuse line 220 is greater than each of the straight lines 218, the midway low intensity zone 224 is greater than each of the midway low intensity zones 222. Consequently, the midway low intensity zones 222, 224 have: (a) substantially different light intensities; and (b) substantially different light pattern profiles or sizes. This light variation or non-uniformity among the midway low intensity zones 222, 224 treats the plurality of items 12, 14, 16 (FIG. 1) with different levels or degrees of light reception. For example, plant No. 8 may be located below midway low intensity zones 222, and plant No. 9 may be located below midway low intensity zone 224. Plant No. 9 would receive a substantially lower level of light than plant No. 8 because of the greater length of the hypotenuse line 220. As a result, plant No. 9 can suffer from underdevelopment or poor yield in comparison to plant No. 8. This disparity in light intensity causes inconsistency in the growth, health, yield or production across an entire table, bed or tray supporting items intended to receive artificial light.

Figure 34:
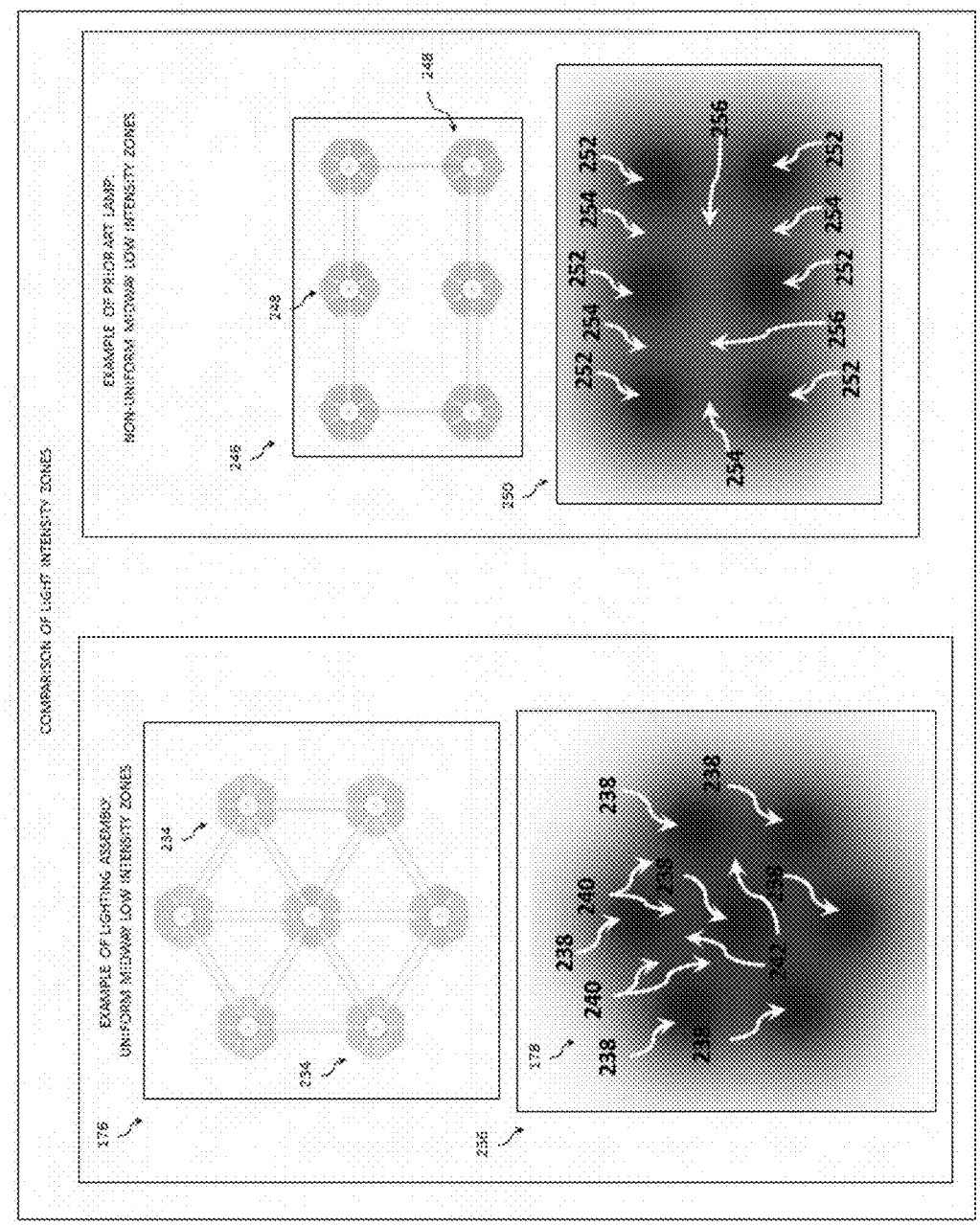
FIG. 34 is a schematic diagram illustrating another example of the performance of an embodiment of a lighting assembly compared to the performance of a prior art lamp.

Referring to FIG. 34, in an embodiment, the lighting assembly 176 (also shown in FIGS. 29-30) has a plurality of point light sources 234. The lighting assembly 176 is operable to generate light pattern 236. Light pattern 236 has: (a) high intensity zones 238 at the location of each of the point light sources 234; (b) midway low intensity zones 240 located midway between any two of the point light sources 234; and (c) central low intensity zones 242 located at the centers of the tri-sets of the lighting assembly 176, such as tri-set 178. In this embodiment, all of the midway low intensity zones 240 have equal intensities or luminosity levels, each of the central low intensity zones 242 has an intensity or luminosity magnitude which is substantial equal to the luminosity of any midway low intensity zone 240. In one example, the luminosity levels of any central low intensity zone 242 and any midway low intensity zone 240 vary by less than 16%. As shown, the shading levels at zones 240 and 242 are not noticeably different, representing substantially the same luminosity among the zones 240, 242. This relative high degree of light intensity uniformity across the entire space below and between the point light sources 234 facilitates greater health and consistency in production, harvest or yield across an entire table 18, bed or tray supporting items 12, 14, 16 (FIG. 1).

In contrast, referring again to FIG. 34, known prior art lamp 246 has a plurality of point light sources 248. The prior art lamp 246 is operable to generate light pattern 250. Light pattern 250 has: (a) high intensity zones 252 at the location of each of the point light sources 248; (b) midway low intensity zones 254 located midway between any two closest point light sources 248; and (c) midway hypotenuse low intensity zones 256 located at the centers of the squares of the prior art lamp 246. In this embodiment, each midway low intensity zones 252 has a luminosity level substantially greater than each of the midway hypotenuse low intensity zones 256. As shown, the visible, lighter shading at zones 256 represents the substantial drop in luminosity compared to the darker shading at zones 254. This variation in luminosity can be equal to or greater than 41%. This relative high degree of light intensity variation across the entire space below and between the point light sources 248 can harm, deteriorate or reduce the health or consistency in production, harvest or yield across an entire table, bed or tray supporting items to receive artificial light.

4. Hang-Ready Lighting Assemblies

In an embodiment shown in FIGS. 35-39, the hang-ready lighting assembly 258 includes: (a) lighting assembly 151; and (b) hanging device 260 configured to hang the lighting assembly 151 from a ceiling, overhead fixture or structure 62. The hanging device 260, in an embodiment, includes: (a) a self-leveler or leveling device 262 operable to orient the lighting assembly 151 (or set of light sources thereof) in a set plane or lighting assembly plane 264 which is parallel to a structure plane 266 through which the structure 62 extends; (b) a mount 267 coupled to the leveling device 262; (c) a position adjuster 110 attached to the mount 267 operable to raise and lower the lighting assembly 151 relative to the structure 62; and (d) the power cord 26 configured to supply electrical power to the hang-ready lighting assembly 258 from a power source within the structure 62 or the facility of the structure 62.

Figure 37:
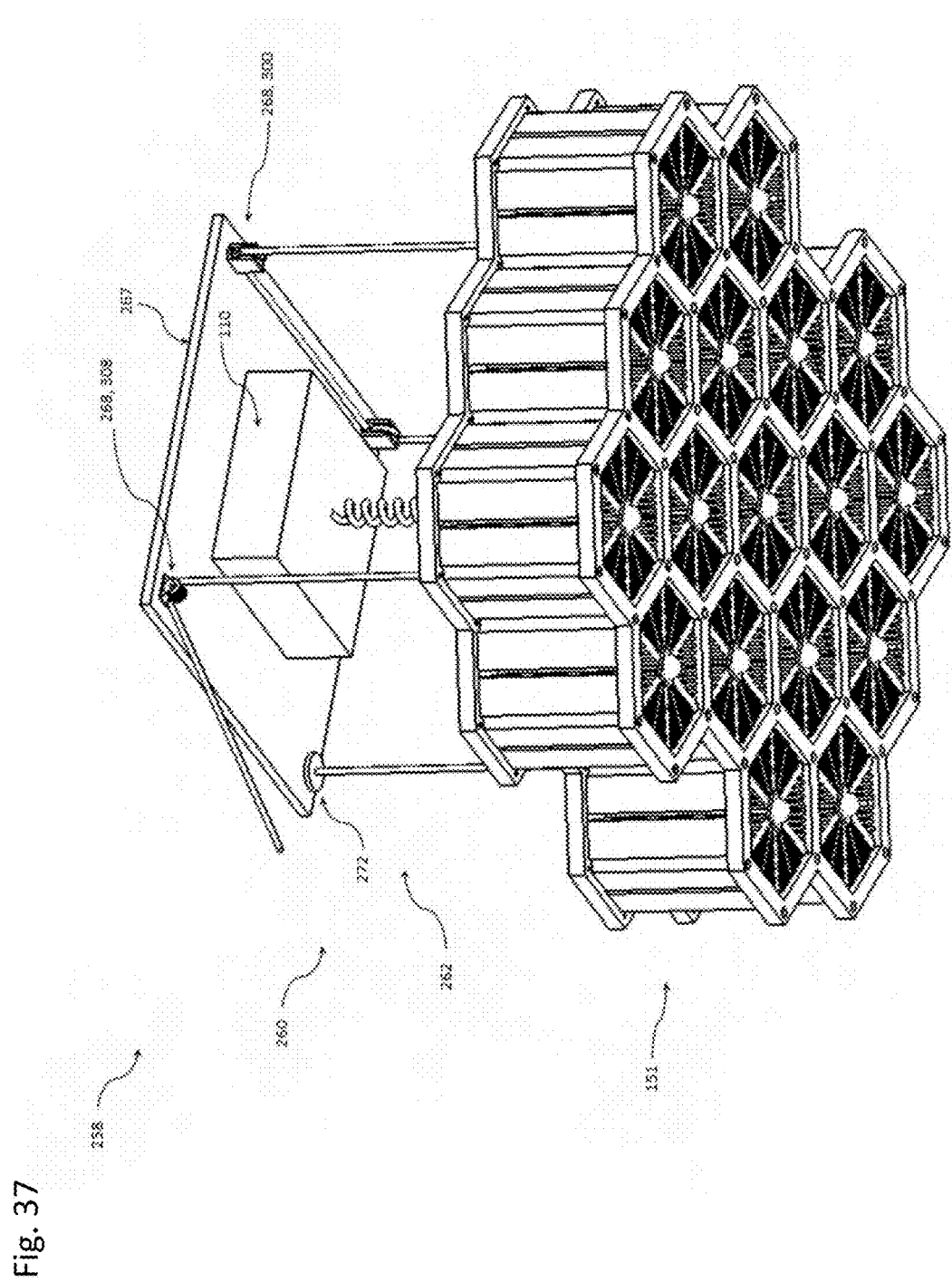
FIG. 37 is a bottom isometric view of the hang-ready lighting assembly of FIG. 35.
Figure 38:
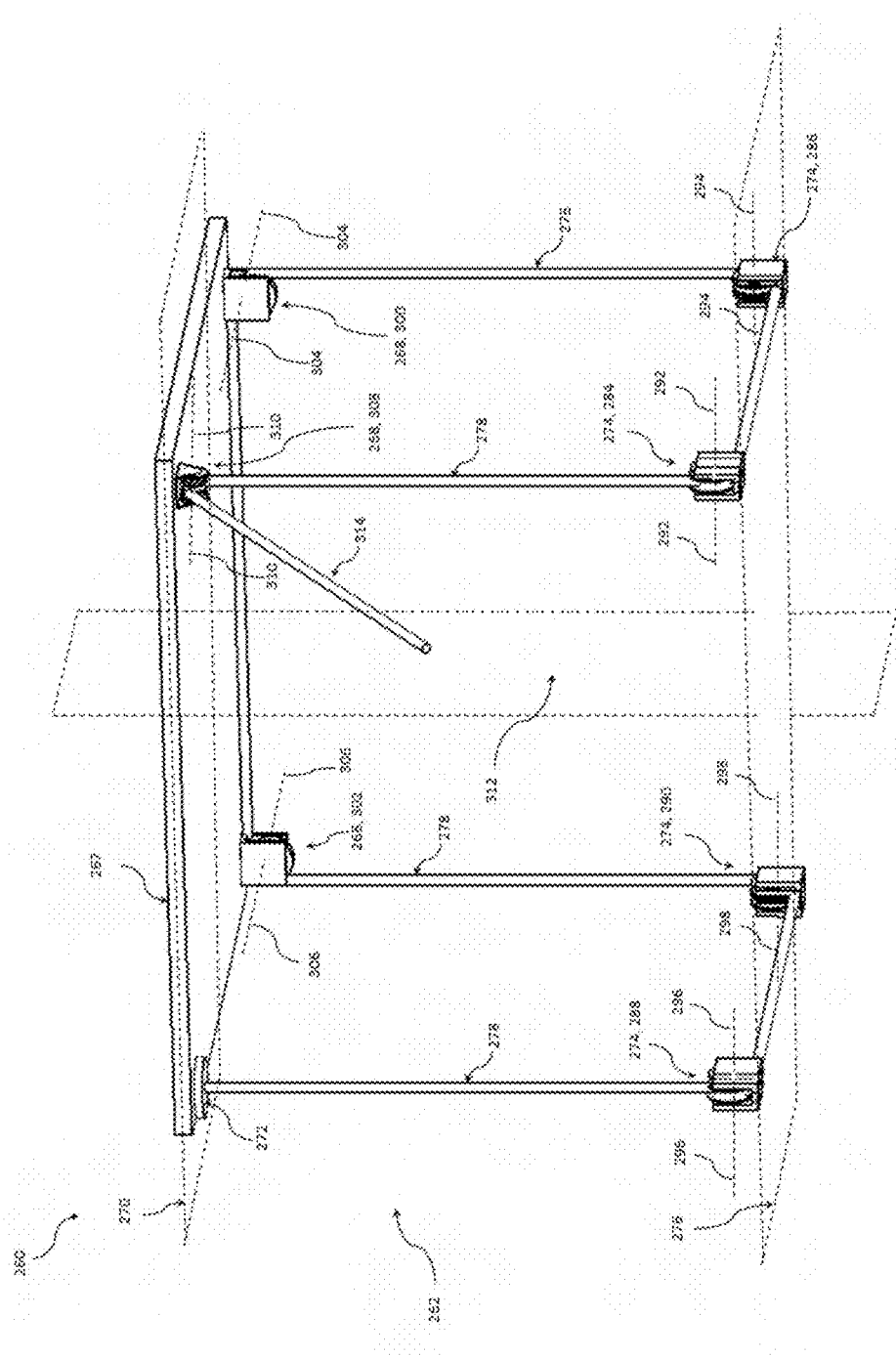
FIG. 38 is a font isometric view of an embodiment of the leveling device of the hang-ready lighting assembly of FIG. 35.

In an embodiment, the mount 267 defines a plurality of holes configured to receive fasteners. The fasteners (e.g., screws or bolts) are configured to secure the mount 267 to the structure 62. As illustrated in FIGS. 37-38, the leveling device 262 includes: (a) a plurality of upper rollers, upper rotatable members or upper pulleys 268 positioned at least partially within an upper plane 270 which passes through the mount 267; (b) an upper sub-mount or anchor 272; (c) a plurality of lower rollers, lower rotatable members or lower pulleys 274 positioned at least partially within a lower plane 276; and (d) a cable, cord, wire, rope, band or other flexible hang line 278 routed through the upper pulleys 268 and lower pulleys 274 and fixedly connected to the anchor 272.

The upper and lower pulleys 268, 274 are oriented with different pivoted positions to enable the leveling device 262 to tilt the lighting assembly plane 264 (and lighting assembly 151) relative to a first axis 280 (FIG. 35) and also relative to a second axis 282 (FIG. 35) which is perpendicular to the first axis 280. In an embodiment, the four lower pulleys 284, 286, 288 and 290 are rotatable about horizontal axes 292, 294, 296 and 298, respectively. Also, the upper pulleys 300 and 302 are rotatable about transverse axes 304 and 306, respectively. Furthermore, the upper pulley 308 is rotatable about horizontal axis 310. Each of the lower horizontal axes 292, 294, 296 and 298 intersects with a vertical plane 312. The upper horizontal axis 310 also intersects with the vertical plane 312. Each of the transverse axes 304 and 306 extends parallel to the vertical plane 312.

In method of operation of a manually-operable embodiment, a user can grasp the line end 314 and pull downward. As the hang line 278 travels outward and downward, the segment of the hang line 278 within the leveling device 262 shortens. At the same time, the different pivoted positions of the pulleys 274, 268 enable the hang line 278 to change directions as traveling between the lower plane 276 and upper plane 270.

Figure 39:
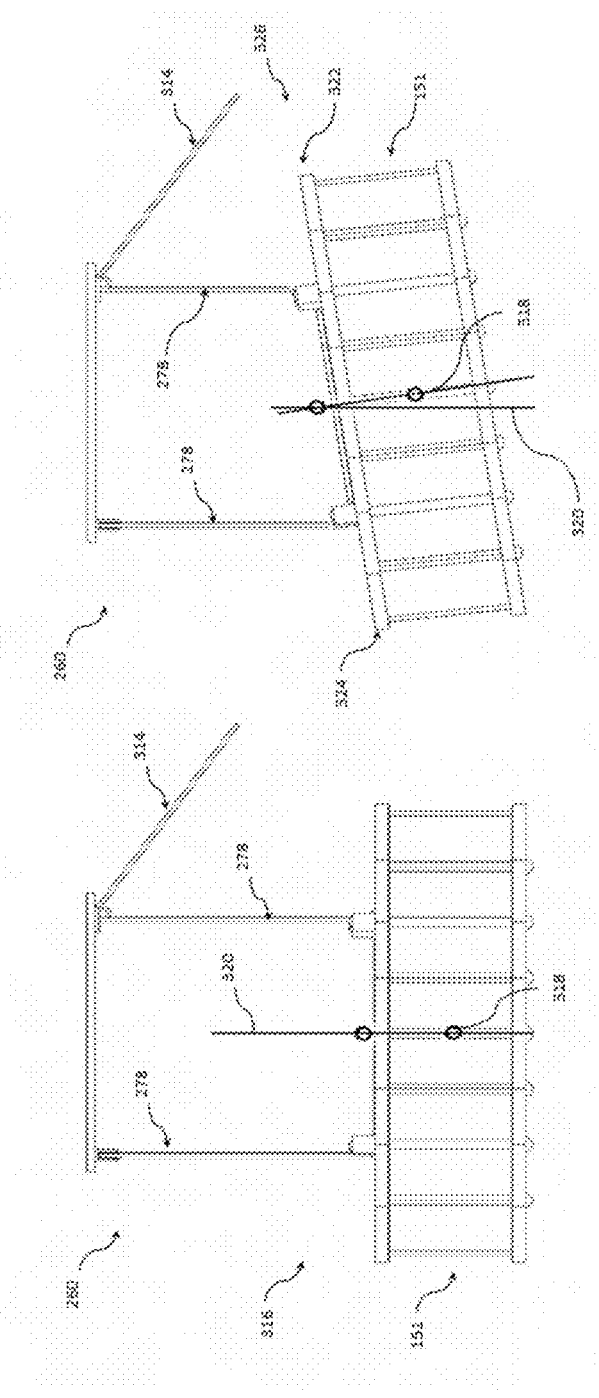
FIG. 39 is a front view illustrating examples of the level and unlevel positions of the hang-ready lighting assembly of FIG. 35.

In an example illustrated in FIG. 39, initially the lighting assembly 151 has an at-rest horizontal or level position 316. As shown, in the level position 316, the center of gravity 318 of the lighting assembly 151 is located on a vertical axis 320. Next, the user decides to raise the lighting assembly 151 by one foot, for example, by pulling downward on the line end 314. There is friction in the internal bearings of the pulleys 274, 268, and there is friction between the hang line 278 and the line-receiving channels of the pulleys 274, 268. Because of this friction, and depending upon variations in the different frictional forces, the lighting assembly plane 276 (and lighting assembly 151) might initially tip or tilt relative to axis 282 (FIG. 35) so that edge 322 moves to a point higher than edge 324, as illustrated in FIG. 39. In such event, the lighting assembly plane 264 (FIG. 1) would become positioned at an angle relative to the structure plane 266 (FIG. 1).

Figure 35:
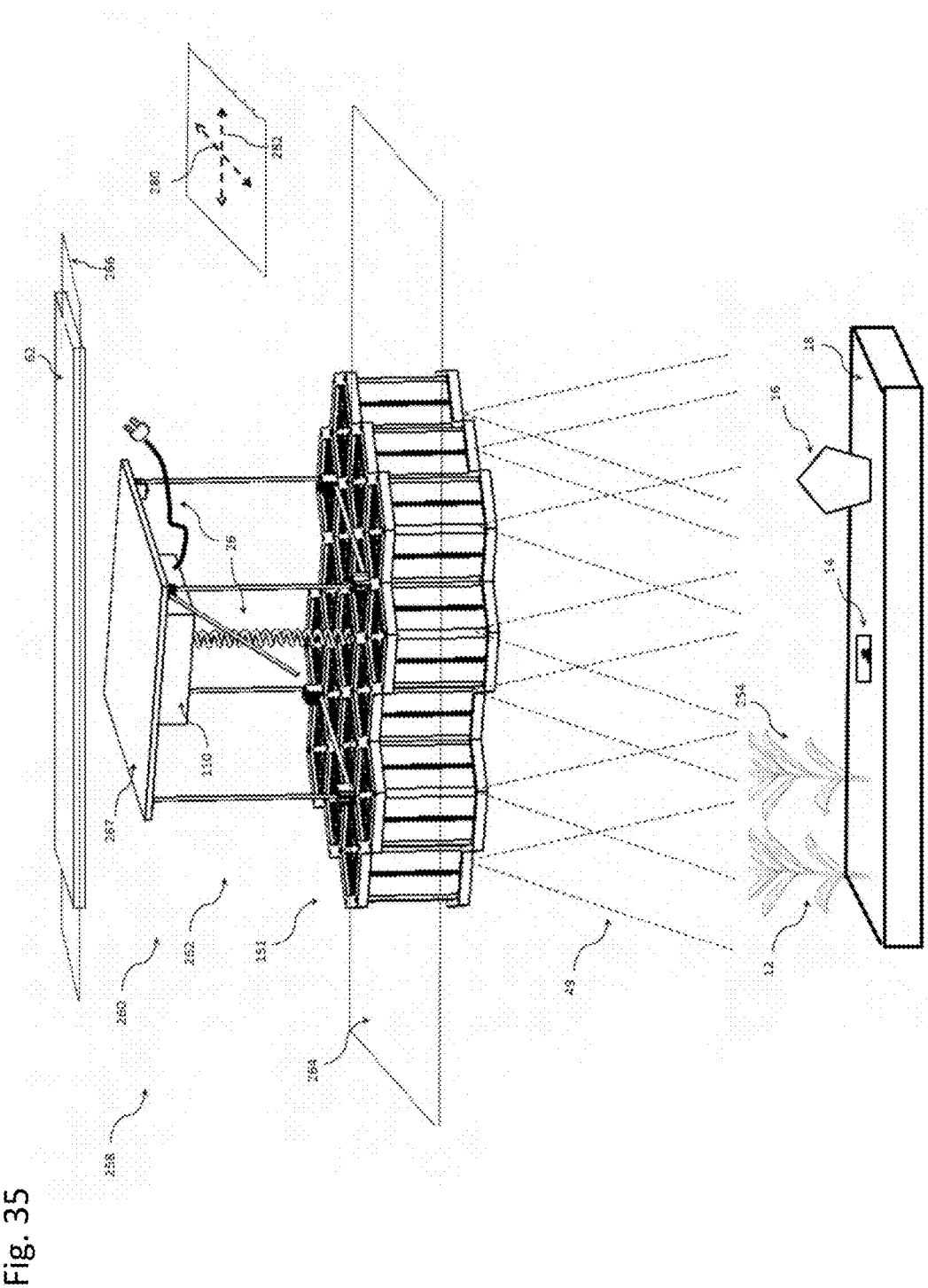
FIG. 35 is a top isometric view of an embodiment of a hang-ready lighting assembly.
Figure 36:
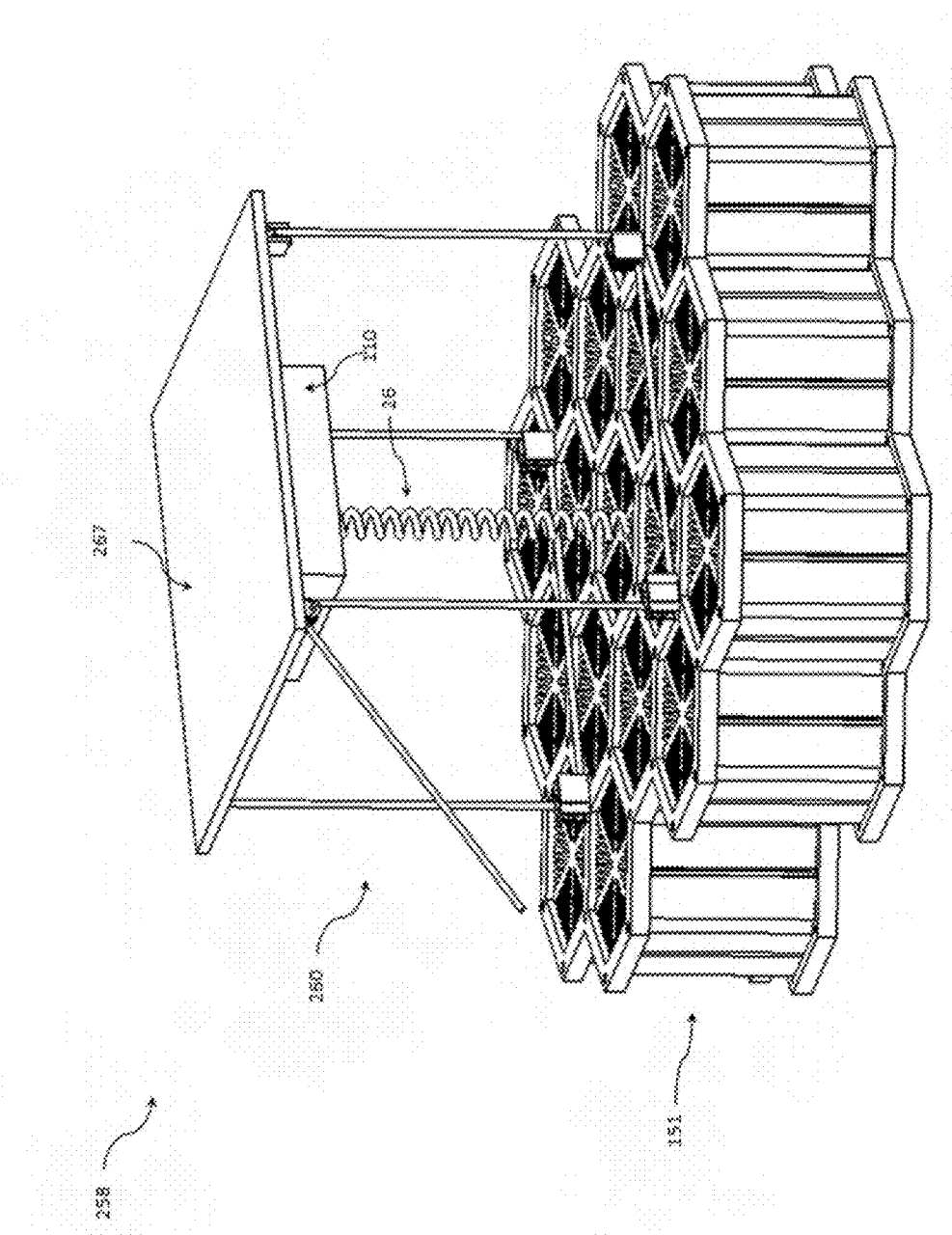
FIG. 36 is another top isometric view of the hang-ready lighting assembly of FIG. 35.

Momentarily after, or during, such tilting relative to the axis 282, the hang-ready lighting assembly 151 might tip or tilt relative to axis 280 (FIG. 35). In such event, the lighting assembly plane 264 (FIG. 1) would become positioned at a different angle relative to the structure plane 266 (FIG. 1). The simultaneous tilting relative to axes 280 and 282 can cause a temporary wobbling motion of the lighting assembly 151. While the lighting assembly 151 is wobbling or positioned at an angle relative to axis 280 or 282, the center of gravity 318 is offset from the vertical axis 320, as shown in FIG. 39, and the lighting assembly 151 has a non-level or unlevel position 326. Eventually, the weight of the lighting assembly 151 overcomes the frictional forces described above. At that point, due to such weight, the lighting assembly 151 returns to the level position 316. In an embodiment, the time period during which the lighting assembly 151 is in the unlevel position 326 is relatively short, such as less than one second. The leveling device 262 therefore provides the planar assembly 151 with the degrees of freedom to pivot about or relative to the different axes 280, 282 (FIG. 35). Accordingly, the hang-ready lighting assembly 258 has a gravity-based, self-leveling or auto-leveling function operable to level a planar object, the lighting assembly 151, about different axes 280, 282 (FIG. 35).

In an embodiment, the position adjuster 110 includes an electromechanical apparatus powered by electricity. The electromechanical apparatus is operatively coupled to the end 314 of the hang line 278. Depending upon the embodiment, the apparatus can include a motor, a solenoid or an electromagnetic mechanism together with a drive system operable to move the hang line 278 in different directions for raising and lowering the lighting assembly 151.

5. Fluid-Driving Lighting Assemblies

Figure 40:
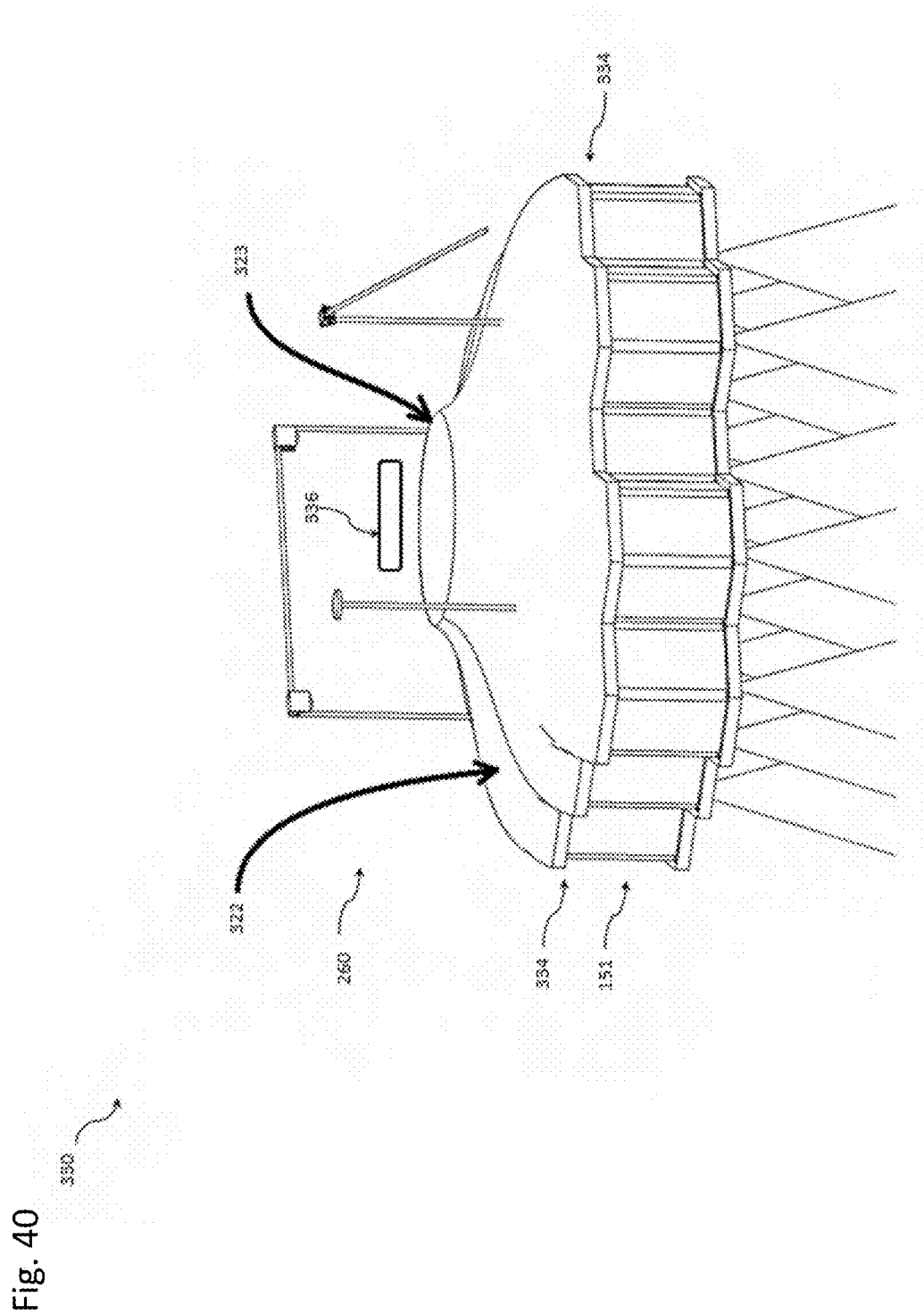
FIG. 40 is a top isometric view of an embodiment of the hang-ready lighting assembly of FIG. 35 having embodiments of a fluid mover and fluid director.
Figure 41:
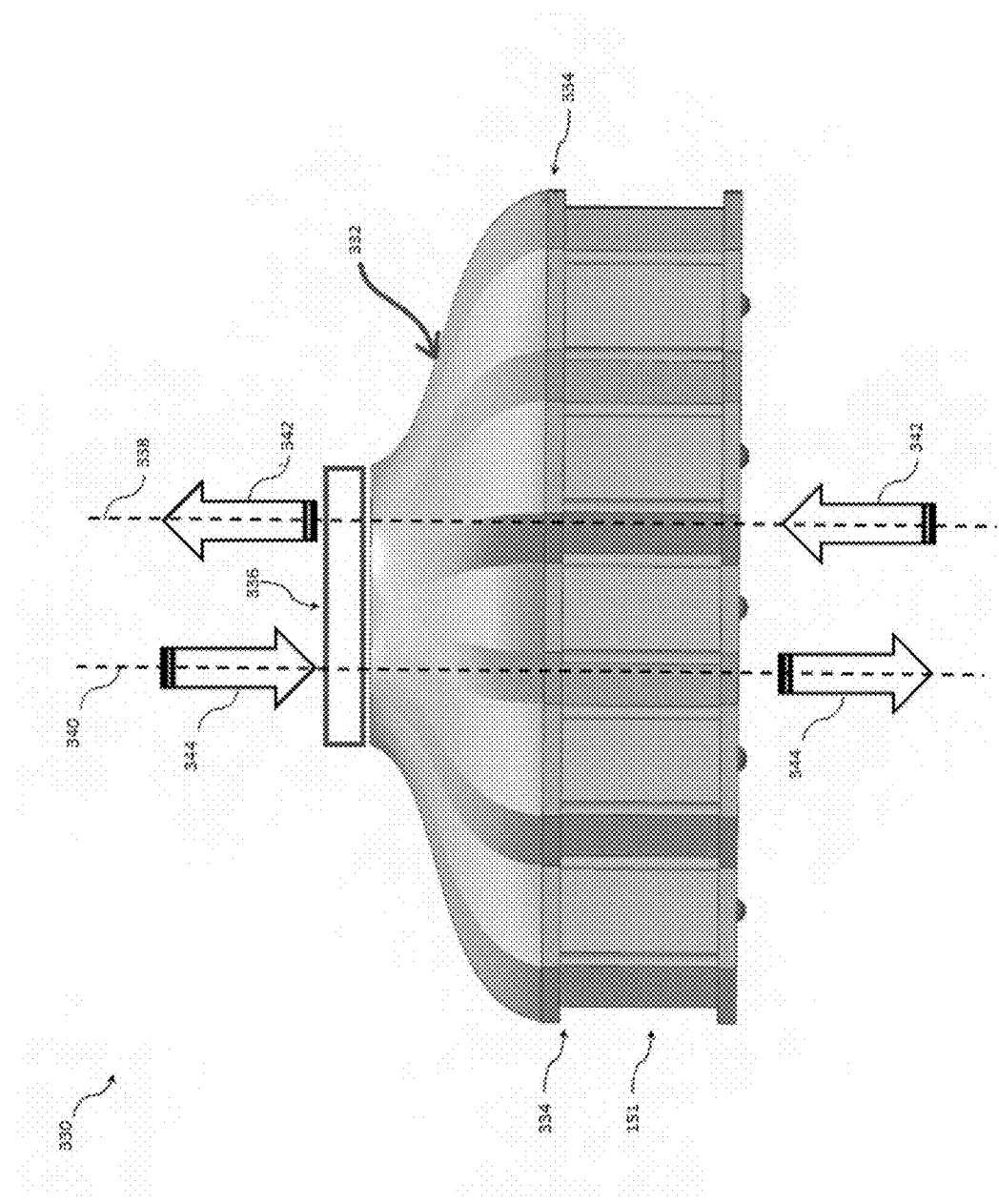
FIG. 41 is a side view of the hang-ready lighting assembly of FIG. 40.

In an embodiment illustrated in FIGS. 40-41, a fluid-driving lighting assembly 330 includes: (a) the hang-ready lighting assembly 258 which, as described above, includes the lighting assembly 151; (b) an enclosure, cap, top, cover, plenum or fluid director 332 attached to the top 334 of the lighting assembly 151 and defining an opening or hole 323; and (c) a fluid mover 336 mounted above the hole 323, such as an electrical fan, blower or other air movement device, operatively coupled to the processor 98 (FIG. 12) of one or more of the light source devices of the lighting assembly 151 or coupled to a main processor as described below. The fluid mover 336 is operable in a plurality of modes, including a draw mode 338 and a push mode 340. In the draw mode 338, the fluid mover 336 draws, pulls or drives warm air 342 upward through the lighting assembly 151 and away from plants and items located below the fluid-driving lighting assembly 330. In the push mode 340, the fluid mover 336 pushes or drives cool or cold air 344 downward through the warm lighting devices of the lighting assembly 151, supplying warmed air to the plants or other items located below the fluid-driving lighting assembly 330.

With such modes of operation, the fluid-driving lighting assembly 330 can remove heat from or add heat to plants and items to maintain an optimal room temperature surrounding the plants and items. In an embodiment, the fluid mover 336 includes a thermostat in wired or wireless communication with a temperature sensor. The temperature sensor is operable to monitor the temperature surrounding the plants and items located below the fluid-driving lighting assembly 330. Based on signals from the temperature sensor, the thermostat regulates the operation and modes of the fluid mover 336.

6. Facility Structures

Figure 42:
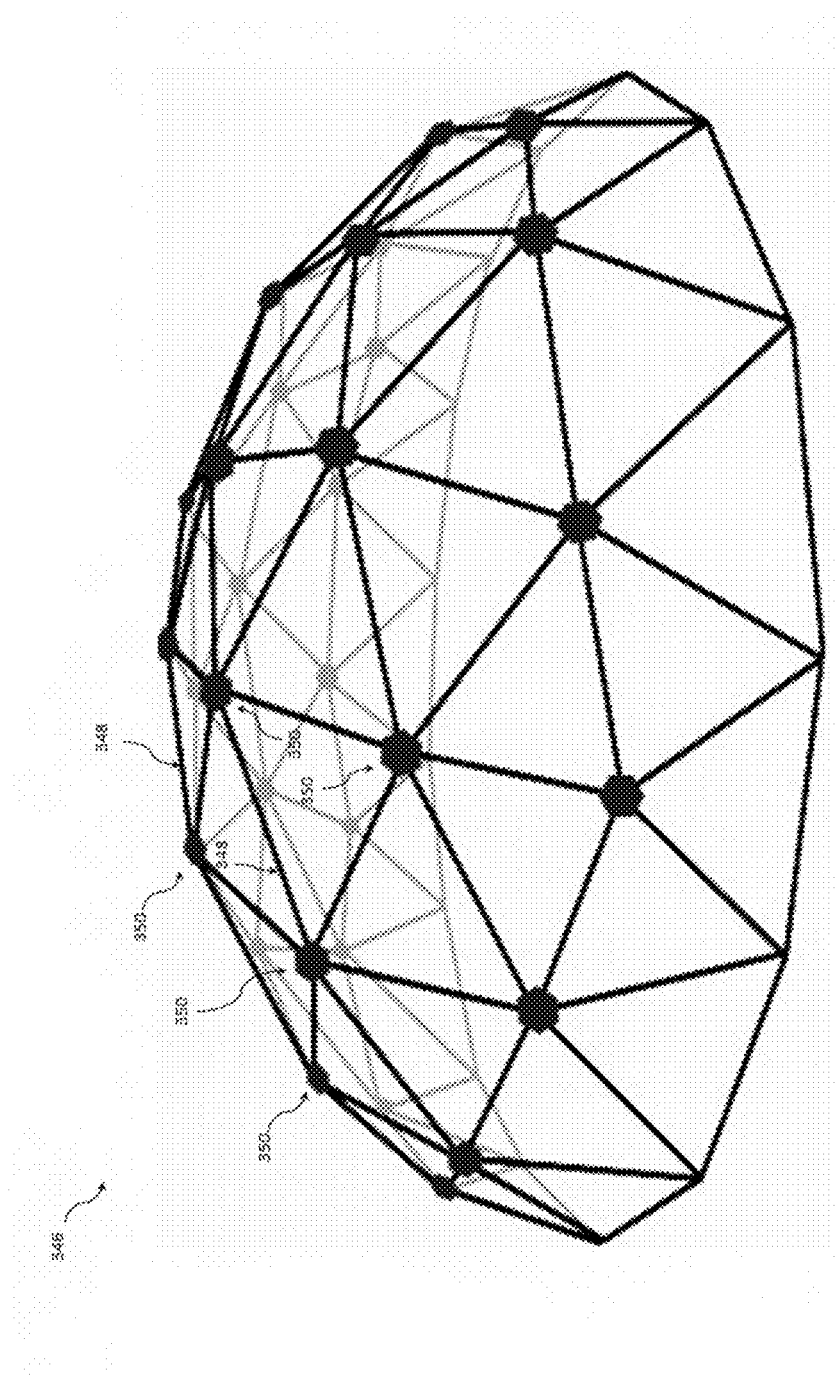
FIG. 42 is a schematic diagram of an embodiment of an overhead facility structure having a plurality of lighting assemblies.

As illustrated in FIG. 42, in an embodiment, a roof, ceiling, window, greenhouse panel, glass panel or other overhead facility structure 346 includes: (a) a plurality of bars, frame sections or arms 348 which form an array of interconnected equilateral triangles corresponding to a honeycomb pattern 125 (FIG. 14); and (b) a lighting device 350 located at each vertex of the overhead facility structure 346. It should be appreciated that, to achieve the spherical shape of the structure 346, some of the tri-sets of lighting devices 350 form triangles which are not exactly equilateral, though they may be substantially equilateral. For example, each such triangle can have one or more interior angles which varies from sixty degrees within a range of five to twenty degrees. Also, it should be appreciated that lighting devices 350 can be omitted from some of the vertices of the structure 346, such as the side-located vertices where lighting is of little or no need. Depending upon the embodiment, the lighting device 350 can include lighting device 10, 64, 66, 76, 88 or 89. In an embodiment, the overhead facility structure 346 is a geodesic greenhouse having a spherical or dome shaped, transparent or translucent top. In such embodiment, the arms 348 can be straight, bent or curvilinear to achieve the associated spherical or dome shape.

7. Control

As described above, in various embodiments, there are a plurality of electrical and electronic components of the lighting devices 10, 64, 66, 76, 88, 89 and the lighting assemblies 114, 124, 136, 139, 140, 150, 151, 159, 164, 176, 186, 192, 258, 330. In addition, a plurality of different types of accessories can be operatively coupled to such lighting devices and lighting assemblies, including, but not limited to, sensors and detectors which: (a) monitor conditions of the air, environment, plants and other items; and (b) generate electrical signals indicative of the monitored conditions.

In an embodiment, a select processor 98 (FIG. 12) of a select lighting device of a lighting assembly is operatively coupled to the processors 98 of all of the other lighting devices within such lighting assembly. As such, the select processor 98 controls the electrical or electronic components of the select lighting device as well as all of the other lighting devices within such lighting assembly. For example, as illustrated in FIG. 15, the centrally-located lighting device 352 can include such a select processor 98 which communicates with, and controls, the processors 98 of the six lighting devices 10 surrounding the lighting device 352.

In another example, as illustrated in FIG. 32, the two-zone or multi-zone lighting assembly 192 can include: (a) a lighting assembly 354 having a select processor 89 in centrally-located lighting device 352; and (b) a lighting assembly 356 having a select processor 89 in centrally-located lighting device 358. In this example, the select processor 89 of lighting assembly 354 controls the lighting and air condition for a zone A under the lighting assembly 354. Likewise, the select processor 89 of lighting assembly 356 independently controls the lighting and air condition for a zone B under the lighting assembly 356.

In an embodiment, each lighting assembly includes and houses a main processor or main controller (not shown) in addition to, and apart from the processors 89. Such main controller is operatively coupled to all of the processors 89 within one or more of the lighting assemblies.

A variety of different types of user input devices can be used to manage and control the operation of the lighting devices and lighting assemblies within a facility. These input devices can include, but are not limited to, a smartphone, cell phone, notebook, laptop, computer, server or Internet access device. These input devices can be wirelessly coupled to the processors 89 or such main controller. By making inputs through these inputs devices, the user can raise or lower lighting assemblies, turn lighting devices on or off, set lighting schedules for the lighting devices, control the modes of air movers to heat or cool plants and items or to carry out other functions related to the accessories described above.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A lighting device comprising:
   a light source operable to direct light in a downward direction in an environment;
   a heat transfer device comprising:
      a conductive portion in conductive communication with the light source; and
      a plurality of conductive structures that are connected to each other, wherein:
         (a) each one of the conductive structures defines a heat transfer channel extending in the downward direction when the light source is oriented to direct light in the downward direction,
         (b) at least a first one of the conductive structures is in contact with the conductive portion, and
         (c) at least a second one of the conductive structures comprises: (i) a lower end defining a lower opening in communication with air in the environment;

and (ii) an upper end defining an upper opening in communication with the air; and a coupler configured to couple the lighting device to a support.

2. The lighting device of claim 1, wherein the light source comprises a point light source, circuitry and at least one light emitter operatively coupled to the circuitry.

3. The lighting device of claim 1, wherein:
the conductive portion comprises a bottom light source mount surface; and
the light source is mounted to the bottom light source mount surface so as to be in contact with the bottom light source mount surface.

4. The lighting device of claim 3, comprising at least one fluid mover operatively coupled to circuitry, wherein the at least one fluid mover is in fluid communication with the at least one of the heat transfer channels.

5. The lighting device of claim 1, wherein:
the light source comprises a light emitter;
the lighting device comprises a support member that supports the light emitter;
the heat transfer channel of the second one of the conductive structures comprises a passageway configured to receive the air through the lower opening and direct the air through the upper opening; and
the heat transfer channel of the first one of the conductive structures comprises a lower blocked end that is blocked by the support member and an upper open end that defines another upper opening.

6. The lighting device of claim 1, wherein each one of the conductive structures is at least partially defined by at least one wall that at least partially defines another one of the conductive structures.

7. The lighting device of claim 6, comprising a sidewall connected to the conductive structures, wherein: (a) the sidewall defines an opening configured to receive the conductive structures; and (b) the sidewall extends upward from the light source in an upward direction.

8. The lighting device of claim 1, wherein, when the lighting device is oriented so as to direct light in the downward direction:
the light source is positioned so that an axis extends through the light source, wherein the axis extends in an upward direction;
the axis extends through one of the heat transfer channels;
the heat transfer device is configured to transfer heat from the light source to the conductive portion which then causes the heat to at least partially transfer to the first one of the conductive structures, which then causes the heat to at least partially transfer to the second one of the conductive structures; and
the lower opening of the second one of the conductive structures is configured to receive fluid that flows upward through the heat transfer channel of the second conductive structure, after which the fluid exits the upper opening wherein the exiting of the fluid facilitates a transfer of the heat away from the light source.

9. The lighting device of claim 1, wherein:
the heat transfer device comprises a primary conductor and a plurality of secondary conductors extending radially from the primary conductor;
the primary conductor comprises the conductive portion; and
the secondary conductors are connected to the conductive structures.

10. The lighting device of claim 1, comprising a conductive element positioned between the conductive portion and the light source.

11. A lighting assembly comprising:
a plurality of lighting devices configured to be connected to each other to form a set, wherein each of the lighting devices comprises:
a light source operable to direct light in a downward direction; and
a heat transfer device defining at least one heat transfer passageway extending upward from the light source in an upward direction; and
at least one coupler configured to couple the lighting assembly to a structure located upward from the light sources,
wherein the set comprises at least three of the light sources,
wherein each one of the light sources within the set is equally distanced from all other light sources within the set,
wherein, due to the equal distancing, the light sources of the set are operable to generate light patterns comprising centers which are equally distanced from one another,
wherein each one the light sources comprises a point light source and a circuit device operatively coupled to the point light source,
wherein the lighting assembly is configured to be located above at least one plant,
wherein the lighting assembly comprises:
(a) a fluid director coupled to the heat transfer devices, the fluid director comprising a lower director end defining a lower director opening and an upper director end defining an upper director opening;
(b) at least one fluid mover in fluid communication with the upper director opening, the at least one fluid mover being operable in a draw mode and a push mode, wherein:
(i) in the draw mode the at least one fluid mover is operable to draw fluid upward through the heat transfer passageways to draw heat away from the at least one plant; and
(ii) in the push mode, the at least one fluid mover is operable to push fluid downward through the heat transfer passageways to direct heat toward the least one plant; and
(c) a processor configured to control all of the point light sources within the set and the at least one fluid mover, the processor being operatively coupled to the circuit devices of all of the light sources within the set.

12. The lighting assembly of claim 11, wherein each one of the point light sources within the set is positioned substantially at a vertex of a single equilateral triangle.

13. The lighting assembly of claim 11, wherein the set comprises no more than three of the point light sources, wherein the three point light sources are substantially located at vertices of a single equilateral triangle.

14. The lighting assembly of claim 11, wherein each one of the circuit devices is mounted to one of the heat transfer devices.

15. The lighting assembly of claim 11, wherein each one of the heat transfer devices comprises: (a) a centrally-located conductive portion; and (b) a plurality of conductive structures connected to the conductive portion and extending in a radial direction to a perimeter, wherein the conductive portion is centered within the perimeter, wherein at least one of the conductive structures is connected to the conductive portion, wherein each one of the conductive structures defines a channel; and (c) a sidewall connected to the conductive structures, wherein: (i) the sidewall extends along the perimeter; and (ii) the sidewall extends upward in the upward direction.

16. The lighting assembly of claim 11, wherein:
the lighting assembly comprises an array of the point light sources;
the at least one set comprises a first set;
the first set comprises three of the point light sources arranged on vertices of a first equilateral triangle;
the array comprises a second set of the point light sources comprising three more of the point light sources arranged on vertices of a second equilateral triangle;
at least one portion of each of the heat transfer devices comprises at least one connection portion;
the connection portions are configured to be connected to each other so that:
(a) at least one of the vertices of the second equilateral triangle is equidistant from a plurality of vertices of the first equilateral triangle; and
(b) a first distance between any two of the light sources that are next to each other is equal to a second distance between any other two of the light sources that are next to each other.

17. The lighting assembly of claim 16, comprising a plurality of fasteners, wherein each one of the fasteners is configured to connect a plurality of the connection portions together.

18. The lighting assembly of claim 16, wherein:
the array comprises a first array; and
the lighting assembly comprising an arm configured to connect the first array to a second array, the second array comprising a plurality of second lighting devices configured to be connected to each other to form the second array, wherein each of the second lighting devices comprises:
a second point light source operable to direct light in the downward direction; and
a second heat transfer device defining at least one heat transfer passageway extending upward from the second point light source in the upward direction.

19. A lighting assembly comprising:
a set of light sources connected to each other, wherein:
a set plane passes through the set, the set plane extending along a first axis and a second axis, wherein the second axis is perpendicular to the first axis; and
in a lighting mode, the set is configured to be positioned so that the light sources direct light in a downward direction; and
a hanging device configured to hang the set from a structure,
wherein the structure extends in a structure plane,
wherein the hanging device is operable to adjust a distance between the set plane and the structure plane,
wherein the hanging device comprises a leveling device,
wherein the leveling device is configured to enable freedom of tilting of the set plane relative to both the first and second axes, wherein the leveling device maintains the set plane parallel to the structure plane after the distance is adjusted.

20. The lighting assembly of claim 19, comprising a plurality of heat transfer devices coupled to the light sources, wherein each one of the heat transfer devices defines at least one heat transfer passageway extending upward from one of the light sources in an upward direction toward the structure,
wherein the set comprises at least three of the light sources,
wherein each one of the light sources within the set is equally distanced from all other light sources within the set,
wherein, due to the equal distancing, the light sources of the set are operable to generate light patterns comprising centers which are equally distanced from one another,
wherein the leveling device comprises a plurality of pulleys comprising:
a first pulley set positioned within a first pulley plane; and
a second pulley set positioned within a second pulley plane,
wherein the pulleys within the first pulley set are configured to rotate about a plurality of first axes,
wherein the pulleys within the second pulley set are configured to rotate about a plurality of second axes,
wherein the first axes are parallel to a vertical plane,
wherein the vertical plane intersects with the set plane and the structure plane,
wherein the second axes intersect with the vertical plane.

21. The lighting assembly of claim 19, wherein the leveling device comprises at least one pulley that is configured to rotate to enable: (a) the freedom of tilting; and (b) maintenance of the set plane relative to the structure plane after the distance is adjusted.

* * * * *